(12) United States Patent
Imai et al.

(10) Patent No.: US 8,081,189 B2
(45) Date of Patent: Dec. 20, 2011

(54) STORAGE MEDIUM HAVING STORED THEREON DISPLAY CONTROL PROGRAM AND DISPLAY CONTROL APPARATUS

(75) Inventors: Daiji Imai, Kyoto (JP); Ryoichiro Atono, Kai (JP); Fumihiro Narita, Kai (JP)

(73) Assignees: Nintendo Co., Ltd., Kyoto (JP); Hal Laboratory Inc., Yamanashi (JP)

( * ) Notice: Subject to any disclaimer, the term of this patent is extended or adjusted under 35 U.S.C. 154(b) by 979 days.

(21) Appl. No.: 12/071,149

(22) Filed: Feb. 15, 2008

(65) Prior Publication Data

US 2009/0153564 A1 Jun. 18, 2009

(30) Foreign Application Priority Data

Dec. 17, 2007 (JP) ................... 2007-324785

(51) Int. Cl.
G06T 11/00 (2006.01)
G06F 17/25 (2006.01)
G06F 3/14 (2006.01)
H04N 5/445 (2006.01)

(52) U.S. Cl. ........ 345/472; 345/467; 715/213; 715/220; 348/563; 725/39; 725/44; 725/47

(58) Field of Classification Search ....... 345/467–472.2; 715/212–220; 348/563–570; 725/37–61
See application file for complete search history.

(56) References Cited

U.S. PATENT DOCUMENTS

| 7,712,116 | B2 * | 5/2010 | Kunieda et al. ................. 725/40 |
| 2001/0030711 | A1 * | 10/2001 | Saito ............................. 348/564 |
| 2005/0193337 | A1 * | 9/2005 | Noguchi et al. .............. 715/542 |

FOREIGN PATENT DOCUMENTS

| JP | 2007-47324 | 2/2007 |
| JP | 2007-47942 | 2/2007 |

* cited by examiner

*Primary Examiner* — Daniel Washburn
*Assistant Examiner* — Fernando Cota, Jr.
(74) *Attorney, Agent, or Firm* — Nixon & Vanderhye P.C.

(57) ABSTRACT

In accordance with a size of a drawing area and a character size, the number of characters arrangeable in the drawing area is calculated. Based on the calculated number of characters, whether a character string in the obtained character size is arranged in the drawing area or the character string in a character size different from the obtained character size is arranged in the drawing area is selected, and the character string is arranged in the drawing area by using the determined character size. The arranged character string is displayed on the display apparatus.

15 Claims, 20 Drawing Sheets

FIG. 13

| BROADCAST CELL DATA | | |
|---|---|---|
| BROADCAST CELL NUMBER | 1 | Db2a |
| BROADCAST TITLE CHARACTER STRING DATA | A B C D E F G H | Db2b |
| NUMBER OF BROADCAST TITLE CHARACTERS DATA | 8 | Db2c |
| TELEVISION STATION DATA | A | Db2d |
| BROADCAST CELL COORDINATE POINT DATA | LEFT TOP CORNER COORDINATE POINT(xsa,ysa) RIGHT BOTTOM CORNER COORDINATE POINT(xsb,ysb) | Db2e |
| DRAWING AREA WIDTH DATA | dw | Db2f |
| DRAWING AREA HEIGHT DATA | dh | Db2g |
| DRAWING CHARACTER SIZE DATA | MEDIUM | Db2h |
| DRAWABLE NUMBER OF LINES DATA | 2 | Db2i |
| DRAWABLE NUMBER OF CHARACTERS DATA | 4 | Db2j |
| BROADCAST CELL NUMBER | 2 | |
| ⋮ | ⋮ | |

Db2

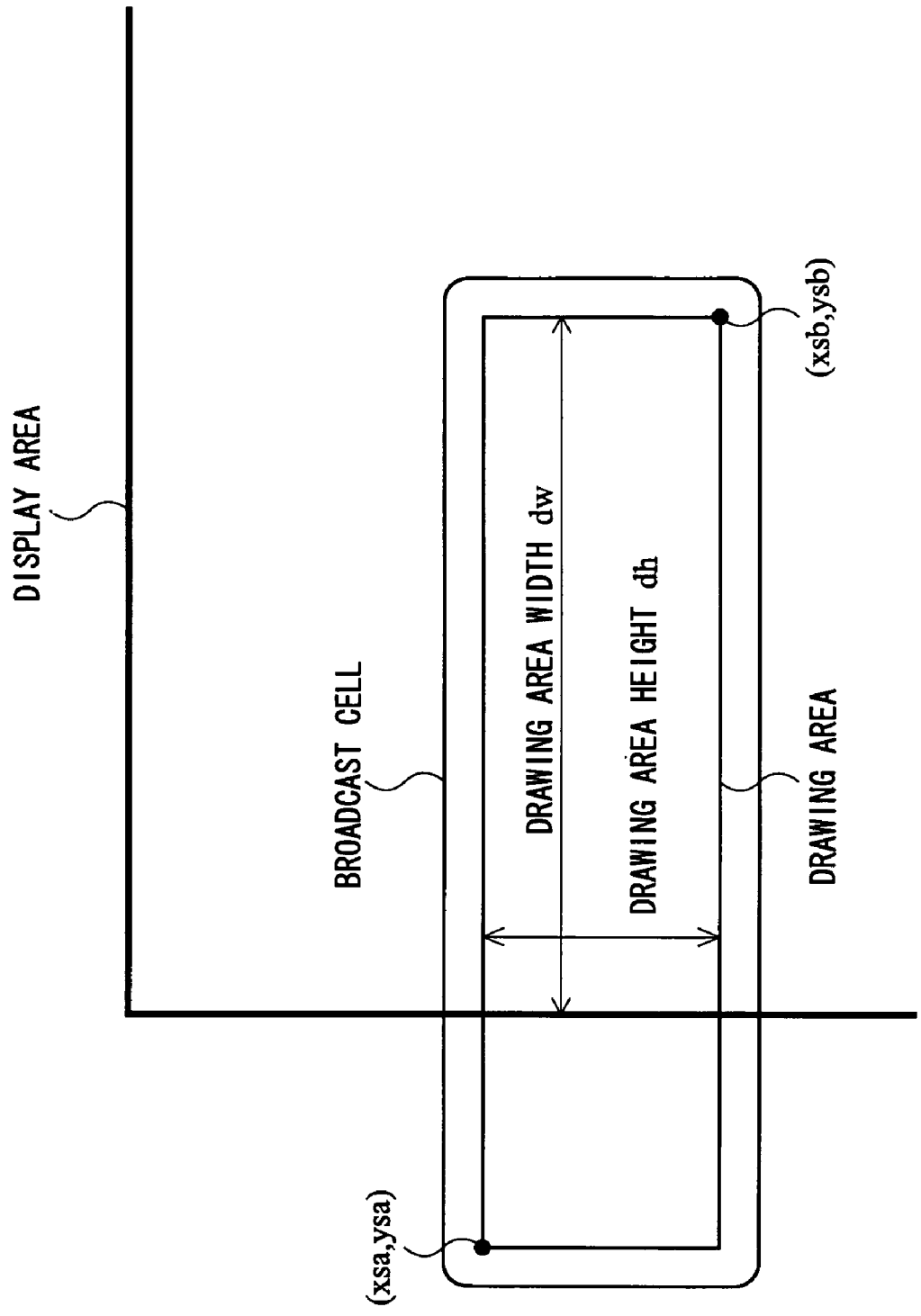

STORAGE MEDIUM HAVING STORED THEREON DISPLAY CONTROL PROGRAM AND DISPLAY CONTROL APPARATUS

CROSS REFERENCE TO RELATED APPLICATION

The disclosure of Japanese Patent Application No. 2007-324785, filed on Dec. 17, 2007, is incorporated herein by reference.

BACKGROUND OF THE INVENTION

1. Field of the Invention

The present invention relates to a storage medium having stored thereon a display control program and a display control apparatus. More specifically, the present invention relates to a storage medium having stored thereon a display control program and display control apparatus which cause character strings to be displayed in a plurality of drawing areas.

2. Description of the Background Art

In recent years, it is increasingly required to improve a viewability of information including an image, a character and the like when the information is displayed on a screen. For example, in order to allow information to be viewed easily, a method of displaying the information on a screen in an enlarged manner is used.

As such a technique, Japanese Laid-Open Patent Publication No. 2007-47324 (hereinafter referred to as Patent document 1), for example, discloses an information processing apparatus which specifies, by using a pointer, an arbitrary position on a reduced image displayed on a screen, thereby displaying an enlarged image corresponding to the reduced image. Further, Japanese Laid-Open Patent Publication No. 2007-47942 (hereinafter referred to as Patent document 2) discloses a data display apparatus which adjusts an enlargement ratio of character data or the like in accordance with a display area, thereby displaying the character data in the display area.

However, the information processing apparatus disclosed in the above-described Patent document 1 enlarges and displays only a reduced image specified by the pointer, and cannot enlarge and display all the displayed reduced images simultaneously. Therefore, when a user wishes to enlarge and view a plurality of reduced images, the user needs to select the reduced images one by one so as to be enlarged and then viewed one by one, which is disadvantageous because of poor operability.

Further, the data display apparatus disclosed in the above-described Patent document 2 automatically sets the enlargement ratio of characters in accordance with the display area regardless of an operation by a user, which is disadvantageous in that the user cannot enlarge characters in accordance with a preference of the user. Still further, the data display apparatus automatically adjusts the enlargement ratio of characters such that the characters stay within the display area. Therefore, if a large number of characters are displayed in the display area, the enlargement ratio of the characters becomes lower, and consequently the viewability becomes poor.

SUMMARY OF THE INVENTION

Therefore, an object of the present invention is to solve at least one of the above-described problems. That is, the object of the present invention is to provide a storage medium having stored thereon a display control program and a display control apparatus which are capable of improving viewability of the display information and also enhancing operability to improve the viewability of the display information.

The present invention has the following features to attain the objects mentioned above. The reference numerals, step numbers (denoted by S, which is short for step, and numbers), drawing numbers and the like in the parentheses indicate the correspondence with the embodiment described below in order to aid in understanding the present invention and are not intended to limit, in any way, the scope of the present invention.

A first aspect is directed to a computer readable storage medium having stored thereon a display control program executed by a computer (10) of an apparatus (5) for arranging and displaying predetermined character strings in a plurality of drawing areas (FIGS. 9 to 11). The display control program is causes the computer to function as operation data acquisition means (a CPU 10 executing step 53; hereinafter simply denoted by step number), character size acquisition means (S61), number-of-characters calculation means (S98), character string arranging means (S103, S104) and display control means (S103, S104). The operation data acquisition means acquires operation data (Da) of a user. The character size acquisition means acquires a character size ("large", "medium" and "small") to be displayed, in accordance with operation details indicated by the operation data. The number-of-characters calculation means calculates the number of characters (Db2j) arrangeable in each of the drawing areas, in accordance with a size (dw, dh) of each of the drawing areas and the character size acquired by the character size acquisition means. The character string arranging means selects, in accordance with the number of characters calculated by the number-of-characters calculation means, whether to arrange each of the character strings in each of the drawing areas by using the character size obtained by the character size acquisition means, or to arrange each of the character strings in each of the drawing areas by using a character size different from the obtained character size, and arranges each of the character strings in each of the drawing areas by using the selected character size. The display control means displays the character strings arranged by the character string arranging means on a display apparatus (2).

In a second aspect based on the first aspect, the computer is further caused to function as number-of-characters determination means (S100). The as number-of-characters determination means determines whether or not the number of characters calculated by the number-of-characters calculation means is equal to or more than a predetermined number (three or more characters). The character string arranging means arranges, when the number-of-characters determination means determines that the number of characters in a drawing area, among the plurality of drawing areas, is equal to or more than the predetermined number, a character string in the drawing area by using the character size acquired by the character size acquisition means, and also arranges, when the number-of-characters determination means determines that the number of characters in a drawing area, among the plurality of drawing areas, is less than the predetermined number, a character string in the drawing area by using a character size relatively smaller than the character size acquired by the character size acquisition means.

In a third aspect based on the second aspect, when the character size acquired by the character size acquisition means is changed, the number-of-characters calculation means recalculates a changed number of characters arrangeable in each of the drawing areas, in accordance with the size of each of the drawing areas and the changed character size acquired by the character size acquisition means. The number-of-characters determination means determines whether or not the changed number of characters, which is recalculated by the number-of-characters calculation means in accordance with the changed character size which is acquired by the character size acquisition means, is equal to or more than the predetermined number. The character string arranging means changes the character size of the character string to be drawn only in a drawing area, among the plurality of drawing areas, with respect to which the number-of-characters determination means determines that the changed number of characters is equal to or more than the predetermined number.

In a fourth aspect based on the first aspect, the number-of-characters calculation means includes number-of-lines calculation means (S113) and number-of-characters-per-line calculation means (S56, S117 to S120). The number-of-lines calculation means calculates the number of character lines arrangeable in the drawing area in accordance with a length (dh) of one side of the drawing area and a length of a character in the one side direction, the character having the character size obtained by the character size acquisition means. The number-of-characters-per-line calculation means calculates the number of characters per line, which is arrangeable in one line in a drawing area, among the drawing areas, in accordance with a length of the other side of the drawing area and a length (dw) of the character in the other side direction, the character having the character size obtained by the character size acquisition means. The number-of-characters calculation means calculates the number of characters arrangeable in the drawing area in accordance with the number of the character lines and the number of the characters per line.

In a fifth aspect based on the first aspect, the computer is further caused to function as drawing area size changing means (S55, S58, S59) and drawing area size calculation means (S56). The drawing area size changing means changes the size (dw) of each of the drawing areas in accordance with the operation details indicated by the operation data. The drawing area size calculation means calculates, when the size of each of the drawing areas is changed by the drawing area size changing means, the changed size of each of the drawing areas. The number-of-characters calculation means calculates a changed number of characters arrangeable in each of the drawing areas in accordance with the changed size of each of the drawing areas and the character size obtained by the character size acquisition means.

In a sixth aspect based on the fifth aspect, the plurality of drawing areas is arranged and displayed in a matrix form. The drawing area size changing means changes a scale of the matrix in one side direction (time axis direction) in accordance with the operation details indicated by the operation data, and changes a length (dw) in the one side direction of each of the drawing areas having been arranged.

In a seventh aspect based on the fifth aspect, the plurality of drawing areas are arranged and displayed in a matrix form. When a display area to be displayed on the display apparatus is moved (S55) in accordance with the operation details indicated by the operation data and when a portion of a drawing area, among the plurality of drawing areas, falls outside the display area, the drawing area size changing means changes the size of the drawing area so as to limit the drawing area to a portion thereof which stays within the display area (FIG. 20).

In an eighth aspect based on the third aspect, the computer is further caused to function as character size reducing means (S102). The character size reducing means reduces, when the number-of-characters determination means determines that the number of characters in a drawing area, among the plurality of drawing areas, is less than the predetermined number, the character size of a character string arranged in the drawing area. When the character size reducing means reduces the character size, the number-of-characters calculation means recalculates the number of characters arrangeable in the drawing area in accordance with the reduced character size and a size of the drawing area of the character string in the reduced character size. The number-of-characters determination means determines whether or not the number of characters, which is recalculated by the number-of-character calculation means in response to the reduced character size which is reduced by the character size reducing means, is equal to or more than the predetermined number.

In a ninth aspect based on the eight aspect, when the number-of-characters determination means determines that the number of characters arrangeable in the drawing area is less than the predetermined number under a circumstance where the character size reducing means has reduced and minimized the character size (Yes in S101), the character string arranging means leaves the drawing area blank.

In a tenth aspect based on the first aspect, the plurality of drawing areas is arranged in a matrix form and displayed as a broadcast listing in which one axis represents a time axis and the other axis represents a broadcast station axis. The character string arranging means at least arranges, in the drawing areas, the character strings indicative of titles of broadcasts corresponding to respective broadcast stations and broadcasting times thereof.

An eleventh aspect is directed to a display control apparatus for arranging and displaying predetermined character strings in a plurality of drawing areas. The display control apparatus comprises operation data acquisition means, character size acquisition means, number-of-characters calculation means, character string arranging means and display control means. The operation data acquisition means acquires operation data of a user. The character size acquisition means acquires a character size to be displayed, in accordance with operation details indicated by the operation data. The number-of-characters calculation means calculates the number of characters arrangeable in each of the drawing areas, in accordance with a size of each of the drawing areas and the character size acquired by the character size acquisition means. The character string arranging means selects whether to arrange each of the character strings in each of the drawing areas by using the character size obtained by the character size acquisition means, or to arrange each of the character strings in each of the drawing areas by using a character size different from the obtained character size, and arranges each of the character strings in each of the drawing areas by using the selected character size. The display control means displays the character strings arranged by the character string arranging means on a display apparatus.

In a twelfth aspect based on the eleventh aspect, the number-of-characters determination means is included. The number-of-characters determination means determines whether or not the number of characters calculated by the number-of-characters calculation means is equal to or more than a predetermined number. The character string arranging means arranges, when the number-of-characters determination means determines that the number of characters in a drawing area, among the plurality of drawing areas, is equal to or more than the predetermined number, a character string in the drawing area by using the character size acquired by the character size acquisition means, and also arranges, when the number-of-characters determination means determines that the number of characters in a drawing area, among the plurality of drawing areas, is less than the predetermined number, a character string in the drawing area by using a character size relatively smaller than the character size acquired by the character size acquisition means.

In a thirteenth aspect based on the twelfth aspect, the number-of-characters calculation means recalculates, when the character size acquired by the character size acquisition means is changed, a changed number of characters arrangeable in each of the drawing areas, in accordance with the size of each of the drawing areas and the changed character size acquired by the character size acquisition means. The number-of-characters determination means determines whether or not the changed number of characters, which is recalculated by the number-of-characters calculation means in accordance with the change in the character size acquired by the character size acquisition means, is equal to or more than the predetermined number. The character string arranging means changes the character size of the character string to be drawn in a drawing area, among the plurality of drawing areas, with respect to which the number-of-characters determination means determines that the changed number of characters is equal to or more than the predetermined value.

According to the first and second aspects, the viewability of the display information is improved in accordance with a character size set by a user, and operability to improve the viewability of the display information is enhanced. For example, in accordance with the size of each of the drawing areas and a specified character size, the number of characters drawable in each of the drawing areas is calculated, and the character size to be drawn in each of the drawing areas is determined depending on the drawable number of characters. Accordingly, the viewability of the display information is improved.

According to the third aspect, in accordance with the size of each of the drawing areas and the changed character size, the changed drawable number of characters is calculated. In accordance with the changed drawable number of characters, whether or not the character size drawn in each of the drawing areas is to be changed is determined, and then the character size is determined accordingly. Therefore, the viewability in each of the drawing areas is improved. Further, in accordance with the operation by the user, whether or not the character size is to be changed can be determined and processing based on a result of the determination can be performed with respect to each of the drawing areas. Accordingly, the operability to improve the viewability is enhanced.

According to the fourth aspect, the number of characters drawable in each of the drawing areas can be effectively calculated through simple processing.

According to the fifth aspect, in accordance with the operation by the user, the size of each of the drawing areas can be changed. Further, the drawable number of characters is calculated in accordance with the changed size of each of the drawing areas. In accordance with the changed side of each of the drawing areas, whether or not the character size is changed can be determined and processing based on a result of the determination can be performed. Accordingly, the operability to improve the viewability is enhanced.

According to the sixth aspect, in accordance with the operation by the user, the scale of the one side direction of the plurality of drawing areas arranged in the matrix form is changed, whereby a length of each of the drawing areas is changed with respect to the one side direction thereof. Further, since the drawable number of characters is calculated based on the changed size of each of the drawing areas, whether or not the character size is to be changed can be determined in accordance with the changed length of each of the drawing areas in the one side direction, and processing based on a result of the determination can be performed. Accordingly, the operability to improve the viewability is enhanced.

According to the seventh aspect, in accordance with the operation by the user, the display range to be displayed on the display apparatus can be moved. With regard to the drawing area whose portion falls outside the display range, the drawable number of characters is calculated based on the changed size of a range of the drawing area which is limited to a portion of the drawing area, the portion staying within the display range. Accordingly, in accordance with the move of the display range, whether or not the character size of each of the drawing areas, which is located at outer edges of the display area, is to be changed can be determined and then processing based on a result of the determination can be performed. Therefore, the operability to improve the viewability is enhanced.

According to the eighth aspect, the character size can be reduced to the level at which the number of characters arranged in the drawing area becomes equal to or more than a predetermined number, and thus information composed of the predetermined number of characters can be included in each of the drawing areas.

According to the ninth aspect, when the number of characters to be arranged in the drawing area is less than the predetermined number even in the case where the minimum character size is used, the drawing area is displayed blank. Accordingly, it is possible to prevent a confusing display, which is caused by displaying insufficient information in the drawing area, and deterioration in viewability.

According to the tenth aspect, the viewability of the broadcast information described in the broadcast listing in accordance with the user's character size setting is improved, and operability to improve the viewability of the broadcast information is also enhanced.

According to the display control apparatus of the present invention, it is possible to attain an effect similar to that exerted by the above-described computer readable storage medium having the display control program stored thereon.

These and other objects, features, aspects and advantages of the present invention will become more apparent from the following detailed description of the present invention when taken in conjunction with the accompanying drawings.

BRIEF DESCRIPTION OF THE DRAWINGS

FIG. 13 is a diagram showing, in detail, an exemplary content of broadcast cell data Db2 shown in FIG. 12;

FIG. 20 is a diagram illustrating another exemplary setting of the drawing area width dw and the drawing area height dh which are set in the case where a portion of the broadcast cell stays within the display area.

DESCRIPTION OF THE PREFERRED EMBODIMENTS

Figure 1:
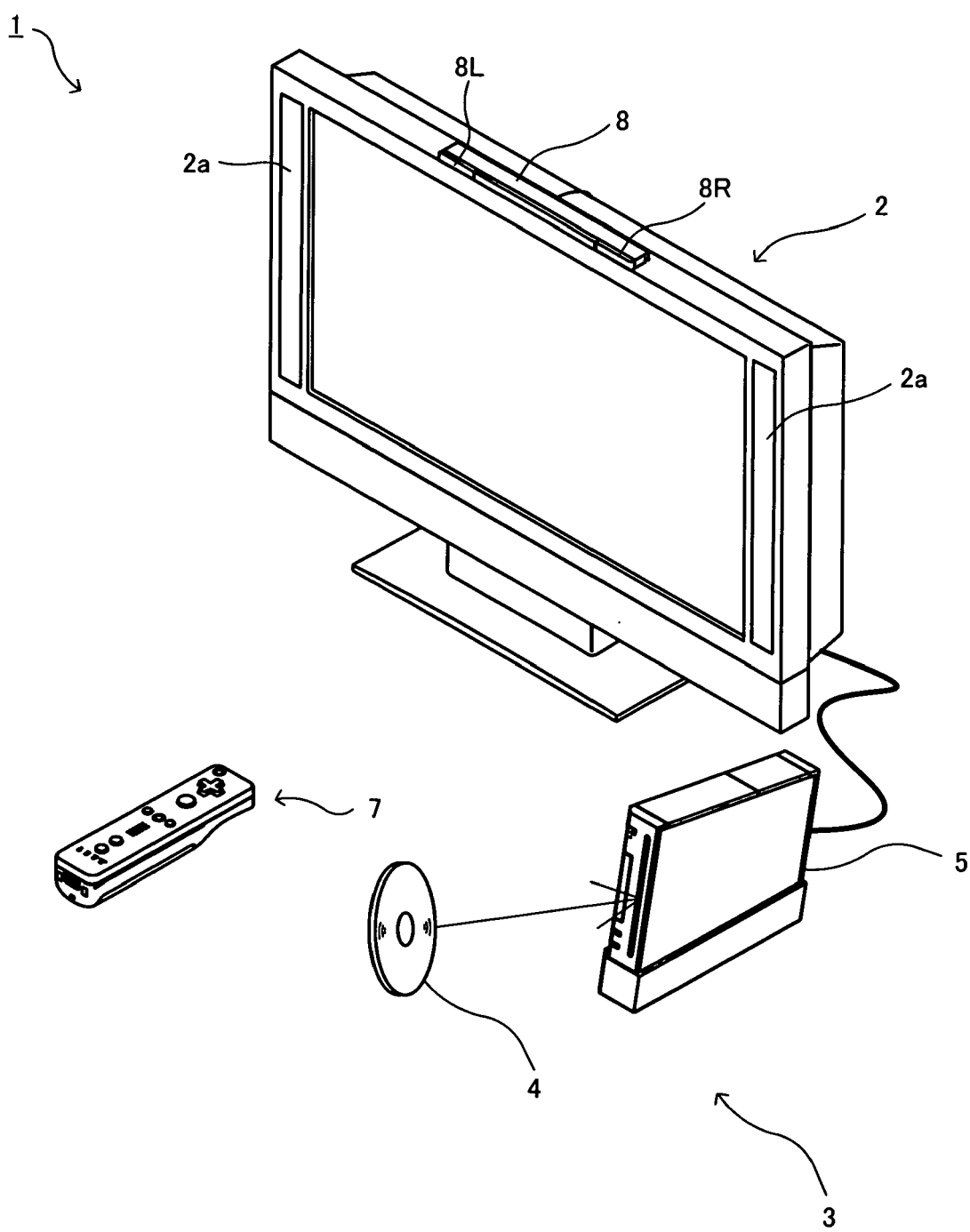
FIG. 1 is an external view illustrating a game system according to one embodiment of the present invention.
Figure 2:
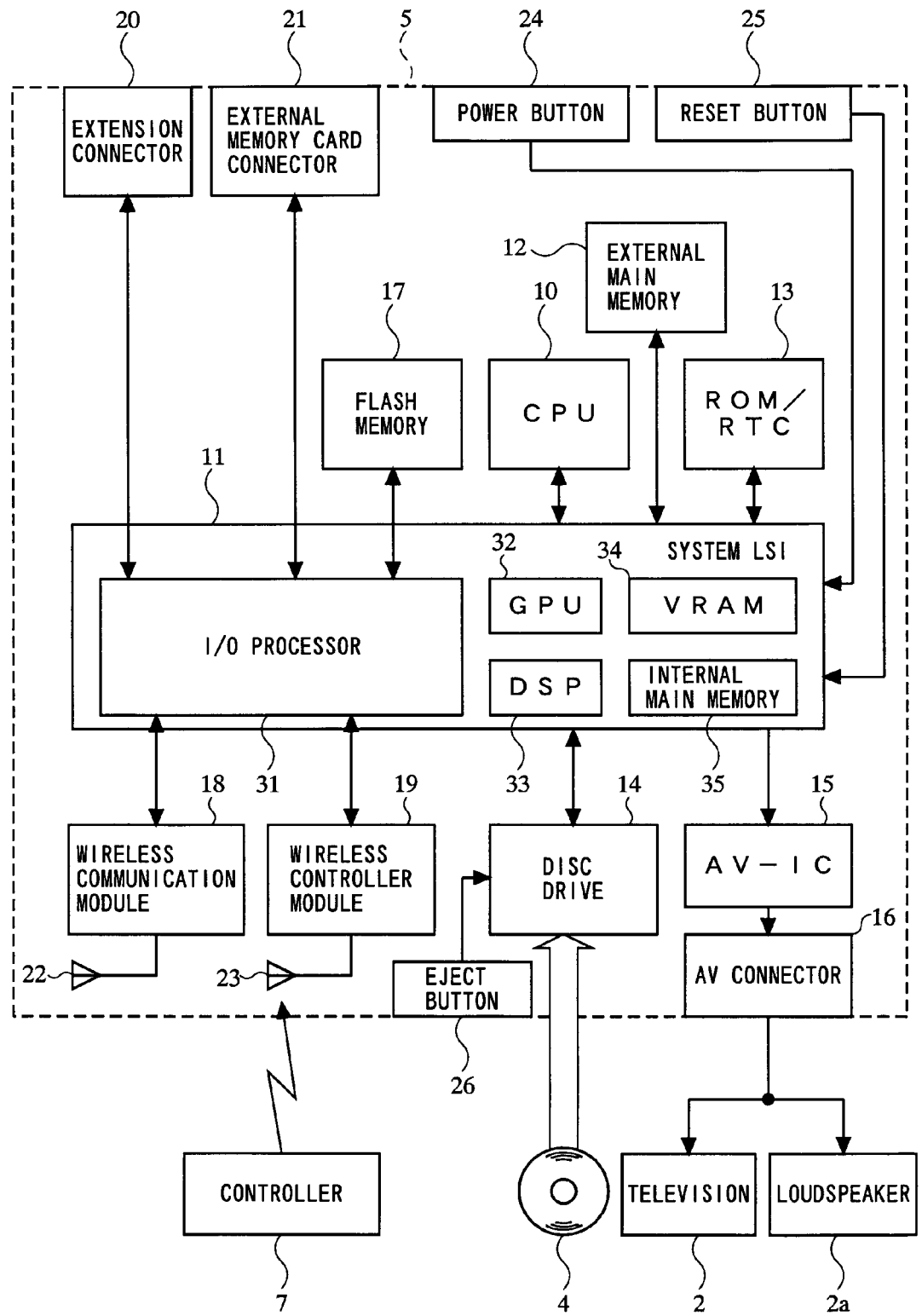
FIG. 2 is a functional block diagram of a game apparatus body 5 shown in FIG. 1.

With reference to FIG. 1, a display control apparatus, on which a display control program according to one embodiment of the present invention is executed, will be described. Hereinafter, for the sake of specific explanation, a game system including a stationary game apparatus body 5 will be described as an example of the display control apparatus. FIG. 1 is an external view of a game system 1 including a stationary game apparatus 3. FIG. 2 is a block diagram of the game apparatus body 5. Hereinafter, the game system 1 will be described.

As shown in FIG. 1, the game system 1 is composed of a home television receiver (hereinafter referred to as a monitor) 2, which is exemplary display means, and the stationary game apparatus 3 connected to the monitor 2 via a connection cord. The monitor 2 includes loudspeakers 2a for outputting an audio signal outputted from the game apparatus body 5. The game apparatus 3 includes an optical disc 4 having a game program stored thereon, the game apparatus body 5 incorporating a computer for executing the game program stored on the optical disc 4 and for outputting and displaying a game screen on the monitor 2, and a controller 7 for providing the game apparatus body 5 with operational information necessary for operating a play character or the like displayed on the game screen.

The game apparatus body 5 embeds therein a wireless controller module 19 (see FIG. 2). The wireless controller module 19 receives data wirelessly transmitted from the controller 7, and transmits the data from the game apparatus body 5 to the controller 7, thereby causing the controller 7 and the game apparatus body 5 to be connected to each other via wireless communication. The optical disc 4, which is an exemplary information storage medium exchangeably used to the game apparatus body 5, is detachably inserted to the game apparatus body 5.

The game apparatus body 5 is equipped with a flash memory 17 (see FIG. 2) which functions as a backup memory for fixedly storing data such as various data described later and save data saved during game software processing. On the game apparatus body 5, the game program or the like stored on the optical disc 4 is executed, and a result thereof is displayed on the monitor 2 as a game image. In addition to the optical disc 4, the game program or the like may be previously stored in the flash memory 17 and then executed. Further, on the game apparatus body 5, by using the save data stored in the flash memory 17, it is possible to reproduce a game state previously executed and to display the game image on the monitor 2. A player of the game apparatus body 5 views the game image displayed on the monitor 2, and enjoys a progress of the game while operating the controller 7.

As a first example, the display control program of the present invention is previously stored in an involatile storage apparatus (e.g., the flash memory 17) provided in the game apparatus body 5. As a second example, the display control program of the present invention is provided to the game apparatus body 5 via an external storage medium such as the optical disc 4. As a third example, the display control program of the present invention is provided to the game apparatus body 5 via a wired or wireless communication line. The game apparatus body 5, on which the display control program is executed, uses broadcast listing data provided thereto through the wired or wireless communication line and causes a broadcast listing indicated by the broadcast listing data to be displayed on the monitor 2.

The controller 7 wirelessly transmits transmission data such as operation information and the like by using a technique of Bluetooth® to the game apparatus body 5 having the wireless controller module 19 embedded therein. The controller 7 is operation means for mainly operating an object and the like displayed on a display screen of the monitor 2. The controller 7 has a housing of a size small enough to be held by one hand, and also has a plurality of operation buttons (including a cross key, a stick and the like) exposed on the surface of the housing. As will become clear later, the controller 7 includes an imaging information calculation section 74 for picking up an image as viewed from the controller 7. Further as an exemplary imaging target of the imaging information calculation section 74, two LED modules (hereinafter referred to as markers) 8L and 8R are located in the vicinity of the display screen of the monitor 2. The markers 8L and 8R each outputs infrared light, for example, forward from the monitor 2. The controller 7 is capable of receiving, by using communication section 75 provided therein, the transmission data wirelessly transmitted from the wireless controller module 19 of the game apparatus body 5, and generating a sound and vibration corresponding to the transmission data.

With reference to FIG. 2, an internal configuration of the game apparatus body 5 will be described. FIG. 2 is a block diagram showing a configuration of the game apparatus body 5. The game apparatus body 5 includes a CPU (Central Processing Unit) 10, a system LSI (Large Scale Integration) 11, an external main memory 12, a ROM/RTC (Read Only Memory/Real Time Clock) 13, a disc drive 14, an AV-IC (Audio Video-Integrated Circuit) 15, the flash memory 17, and the like.

The CPU 10 executes the display control program stored in the flash memory 17 or the like, thereby performing the display control processing. That is, the CPU 10 functions as a display control processor. The CPU 10 also functions as a game processor, and executes a game process by executing the game program stored on the optical disc 4. The CPU 10 is connected to the system LSI 11. To the system LSI 11, not only the CPU 10, but also the external main memory 12, the ROM/RTC 13, the disc drive 14, and the AV-IC 15 are connected. The system LSI 11 performs processing such as control of data transmission among respective component parts connected thereto, generation of an image to be displayed, acquisition of data from an external apparatus, and the like. An internal configuration of the system LSI 11 will be described later. The external main memory 12, which is of a volatile type, stores therein programs such as the game program read from the optical disc 4 and the display control program read from the flash memory 17, and various data. The external main memory 12 is used as a work area and a buffer space for the CPU 10. The ROM/RTC 13 includes a ROM (so-called a boot ROM) incorporating a program for starting up the game apparatus body 5, and a clock circuit (RTC) for counting time. The disc drive 14 reads program data, texture data and the like from the optical disc 4, and writes the read data into an internal main memory 35 described later or the external main memory 12.

Further, provided to the system LSI 11 are an input/output (I/O) processor 31, a GPU (Graphics Processor Unit) 32, a DSP (Digital Signal Processor) 33, a VRAM (Video RAM) 34, and the internal main memory 35. Although not shown in drawings, these component parts 31 to 35 are connected to one another via an internal bus.

The GPU 32 functions as a part of drawing means, and generates an image in accordance with a graphics command (draw command) from the CPU 10. The VRAM 34 stores therein data (such as polygon data and texture data) necessary for the GPU 32 to execute the graphics command. When an image is to be generated, the GPU 32 uses data stored in the VRAM 34 and generates the image data.

The DSP 33 functions as an audio processor, and generates audio data by using sound data and sound waveform (tone quality) data stored in the internal main memory 35 and the external main memory 12. In order to output a sound from the loudspeakers 2a, the DSP 33 reads the above-described sound data, and outputs the read data to the loudspeakers 2a via the AV-IC 15 and the AV connector 16, the loudspeakers 2 being provided on the monitor 2. In order to output the sound from the loudspeaker 706 (see FIG. 7) provided on the controller 7, the DSP 33 reads the above-described sound data and transmits the sound data to the controller 7 via the wireless controller module 19 and an antenna 23.

The image data and the audio data generated as above described are read by the AV-IC 15. The AV-IC 15 outputs the read image data to the monitor 2 via the AV connector 16, and also outputs the read audio data to the loudspeakers 2a embedded in the monitor 2. Accordingly, the image is displayed on the monitor 2, and the sound is outputted from the loudspeakers 2a.

The I/O processor 31 executes transmission of data among component parts connected thereto, and also executes download of data from an external apparatus. The I/O processor 31 is connected to the flash memory 17, the wireless communication module 18, the wireless controller module 19, an extension connector 20, and an external memory card connector 21. An antenna 22 is connected to the wireless communication module 18, and an antenna 23 is connected to the wireless controller module 19.

The I/O processor 31 is connected to a network via the wireless communication module 18 and the antenna 22, and is capable of communicating with another game apparatus and various servers connected to the network. The I/O processor 31 accesses the flash memory 17 at regular intervals so as to detect data, if any, which is necessary to be transmitted to the network. If the data is detected, the detected data is transmitted to the network via the wireless communication module 18 and the antenna 22. The I/O processor 31 receives data transmitted from another game apparatus and data (such as electronic broadcast listing data) downloaded from a download server via the network, the antenna 22 and the wireless communication module 18, and stores the received data in the flash memory 17. The CPU 10 executes the game program, and read the data stored in the flash memory 17 so as to be used for executing the game program and the display control program. In the flash memory 17, not only data transmitted between the game apparatus body 5 and another game apparatus or various servers, but also save data of a game (result data or midstream data of the game) played by using the game apparatus body 5 may be stored.

The I/O processor 31 receives operation data and the like, which is transmitted from the controller 7 via the antenna 23 and the wireless controller module 19, and (temporarily) stores the operation data in the internal main memory 35 or in the buffer space of the external main memory 12. As with the external main memory 12, the internal main memory 35 may be used for storing therein the programs such as the game programs read from the optical disc 4 and from the flash memory 17, and various data, and may be used as the work area or the buffer space for the CPU 10.

The extension connector 20 and the external memory card connector 21 are connected to the I/O processor 31. The extension connector 20 is an interface connector as typified by a USB and an SCSI, and is capable of performing communication with the network, instead of the wireless communication module 18, by connecting thereto a medium such as an external storage medium, a peripheral device such as another controller, or a wired communication connector. The external memory card connector 21 is a connector for connecting thereto the external storage medium such as a memory card. For example, the I/O processor 31 accesses the external storage medium via the extension connector 20 or the external memory card connector 21, and then saves data or reads data.

Provided to the game apparatus body 5 (for example, on the front main surface thereof) are a power button 24 of the game apparatus body 5, a reset button 25 of the game process, an insertion slot in which the optical disc 4 is inserted, an eject button 26 for causing the optical disc 4 to be ejected from the insertion slot of the game apparatus body 5, and the like. The power button 24 and the reset button 25 are connected to the system LSI 11. When the power button is turned on, power is supplied to each of the component parts of the game apparatus body 5 via an AC adaptor, which is not shown. When the reset button 25 is pressed, the system LSI 11 reactivates the start-up program of the game apparatus body 5. The eject button 26 is connected to the disc drive 14. When the eject button 26 is pressed, the optical disc 4 is ejected from the disc drive 14.

Figure 3:
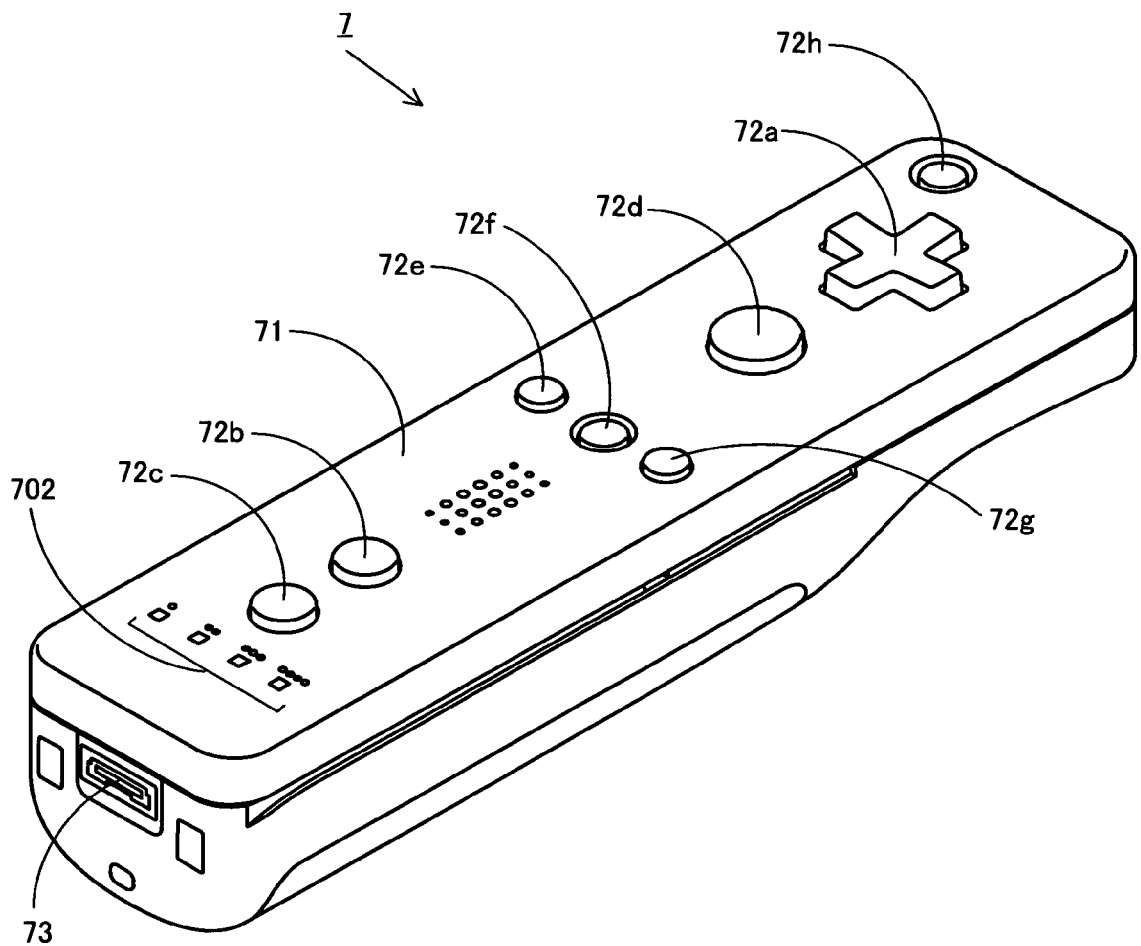
FIG. 3 is a perspective view of a controller 7 as viewed from a top rear side thereof shown in FIG. 1.
Figure 4:
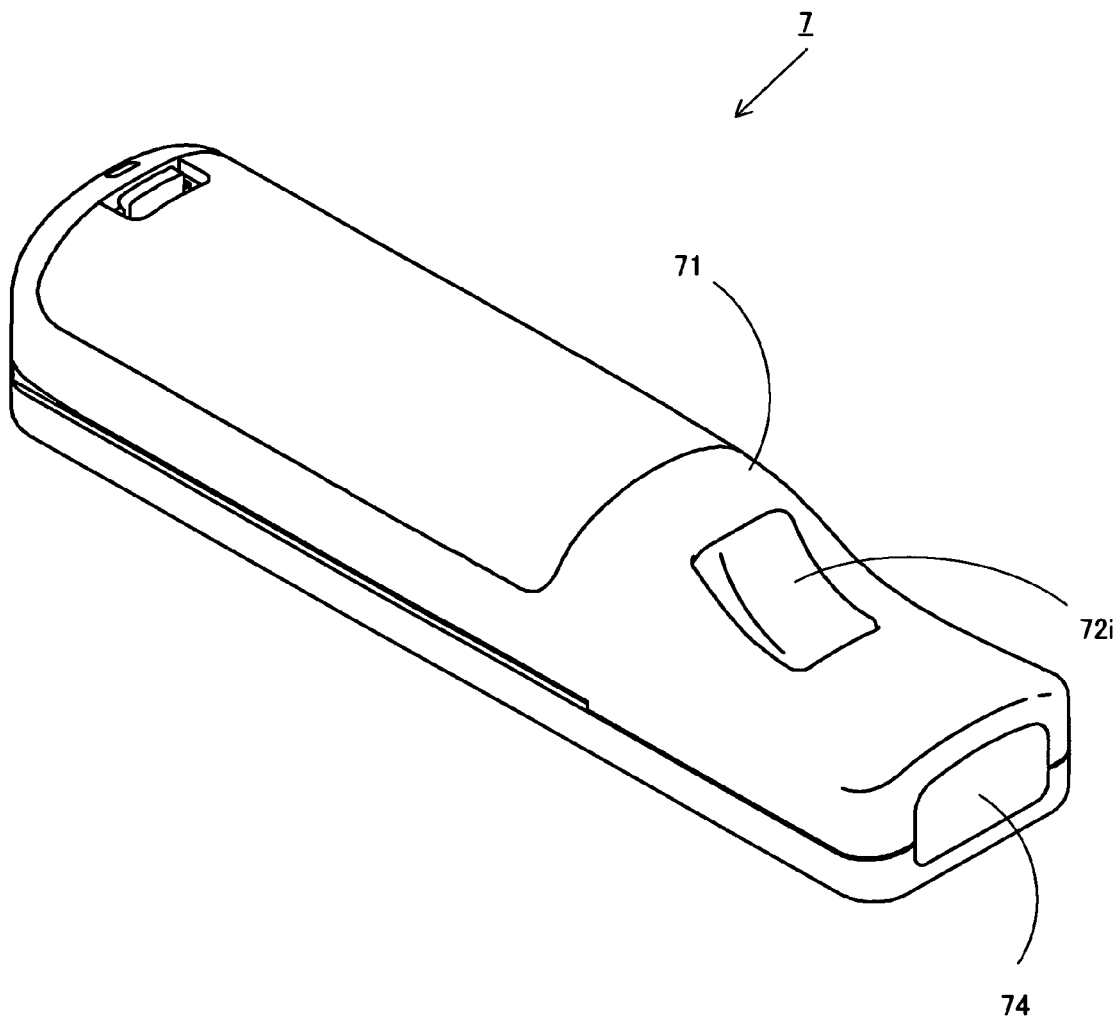
FIG. 4 is a perspective view of the controller 7 as viewed from a bottom front side thereof shown in FIG. 3.

With reference to FIGS. 3 and 4, the controller 7 will be described. FIG. 3 is a perspective view of the controller 7 as viewed from a top rear side thereof. FIG. 4 is a perspective view of the controller 7 as viewed from a bottom front side thereof.

As shown in FIGS. 3 and 4, the controller 7 includes a housing 71, which is formed by, for example, plastic molding, and a plurality of operation sections are provided on the housing. The housing has a substantially parallelepiped shape extending in a longitudinal direction from front to rear, and an overall size thereof is small enough to be held by one hand of an adult or even a child.

At a front center portion of a top surface of the housing 71, a cross key 72a is provided. The cross key 72a is a cross-shaped four direction push switch, and the operation portions thereof are respectively located on cross-shaped projecting portions arranged at intervals of 90 degrees such that the operation portions correspond to four directions (front, rear, right and left). A player selects one of the front, rear, right, and right directions by pressing one of the operation portions of the cross key 72a. Through an operation of the cross key 72a, the player can, for example, scroll and display a broadcast listing, indicate a direction in which a player character or the like appearing in a virtual game world is to move, or select an instruction from a plurality of choices.

The cross key 72a is an operation section for outputting an operation signal in accordance with the direction input operation performed by the player as above described, and such an operation may be provide in another form. For example, the operation section may be provided such that four push switches are arranged in the cross directions and an operation signal is outputted by the player's pressing one of the four push switches. Further, in addition to the four push switches, a center switch may be provided at a crossing position of the above-described cross directions so as to provide an operation section composed of the four push switches and the center switch. Alternatively, the cross key 72a may be replaced with an operation section which includes an inclinable stick (so called a joystick) projecting from the top surface of the housing 71 and which outputs the operation signal in accordance with an inclining direction of the stick. Still alternatively, the cross key 72a may be replaced with an operation section which includes a disc-shaped member horizontally slidable and which outputs an operation signal in accordance with an sliding direction of the disc-shaped member. Still alternatively, the cross key 72a may be replaced with a touchpad.

Behind the cross key 72a on the top surface of the housing 71, a plurality of operation buttons 72b, 72c, 72d, 72e, 72f and 72g are provided. The operation buttons 72b, 72c, 72d, 72e, 72f and 72g are each an operation section for outputting an operation signal assigned thereto when the player presses a head thereof. For example, functions such as a No. 1 button, a No. 2 button, an A button and the like are assigned to the operation buttons 72b, 72c and 72d. Further, functions such as a minus button, a home button, a plus button and the like are assigned to the operation buttons 72e, 72f and 72g. Various operation functions are assigned to these operation buttons 72a, 72b, 72c, 72d, 72e, 72f and 72g in accordance with the game program executed by the game apparatus body 5. For example, when the operation button 72b (No. 1 button) or the operation button 72c (No. 2 button) is pressed, a character size of a broadcast listing displayed in a broadcast listing may be changed. When the operation button 72e (minus button) or the operation button 72g (plus button) is pressed, a time axis of the displayed broadcast listing may be changed. In an exemplary arrangement shown in FIG. 3, the operation buttons 72b, 72c and 72d are arranged in a line at the center in a front-rear direction on the top surface of the housing 71. Further, the operation buttons 72e, 72f, and 72g are arranged in a line on the top surface of the housing 71 in a left-right direction between the operation buttons 72b and 72d. The operation button 72f has a top surface thereof buried in the top surface of the housing 71 so as not to be inadvertently pressed by the player.

In front of the cross key 72a on the top surface of the housing 71, an operation button 72h is provided. The operation button 72h is a power switch for turning on and off the power to the game apparatus body 5 by remote control. The operation button 72h also has a top surface thereof buried in the top surface of the housing 71, so as not to be inadvertently pressed by the player.

Behind the operation button 72c on the top surface of the housing 71, a plurality of LEDs 702 is provided. A controller type (number) is assigned to the controller 7 such that the controller 7 is distinguishable from another controller 7. The LEDs 702 are used for, for example, informing the player about the controller type currently set for the controller. Specifically, a signal is transmitted, from the wireless controller module 19 to the controller 7, so as to light a LED corresponding to the above-described controller type among the plurality of LEDs 702.

On the top surface of the housing 71, loudspeaker holes for emitting a sound from a loudspeaker (the loudspeaker 706 shown in FIG. 5), which is described later, are formed between the operation button 72b and the operation buttons 72e, 72f and 72g.

On a bottom surface of the housing 71, a recessed portion is formed. The recessed portion on the bottom surface of the housing 71 is formed in a position in which an index finger or middle finger of the player is located when the player holds the controller 7 with one hand and points a front portion thereof to the markers 8L and 8R. On a slope surface of the recessed portion, an operation button 72i is provided. The operation button 72i is an operation section acting as, for example, a B button. For example, when the player points and moves the controller 7 while pressing the operation button 72i, the broadcast listing may be scroll-displayed.

On a front surface of the housing 71, an image pickup element 743 constituting a part of an imaging information calculation section 74 is provided. The imaging information calculation section 74 is a system which analyzes image data picked up by the controller 7, identifies an area having a high brightness point in the image, and detects a position of a gravity center, a size and the like of the area. The imaging information calculation section 74 has, for example, a maximum sampling period of about 200 frames/sec., and thus can trace and analyze even a relatively fast motion of the controller 7. A configuration of the imaging information calculation section 74 will be described later in detail. On a rear surface of the housing 71, a connector 73 is provided. The connector 73 is, for example, an edge connector, and is used for coupling and connecting the controller with a connection cable.

Figure 5:
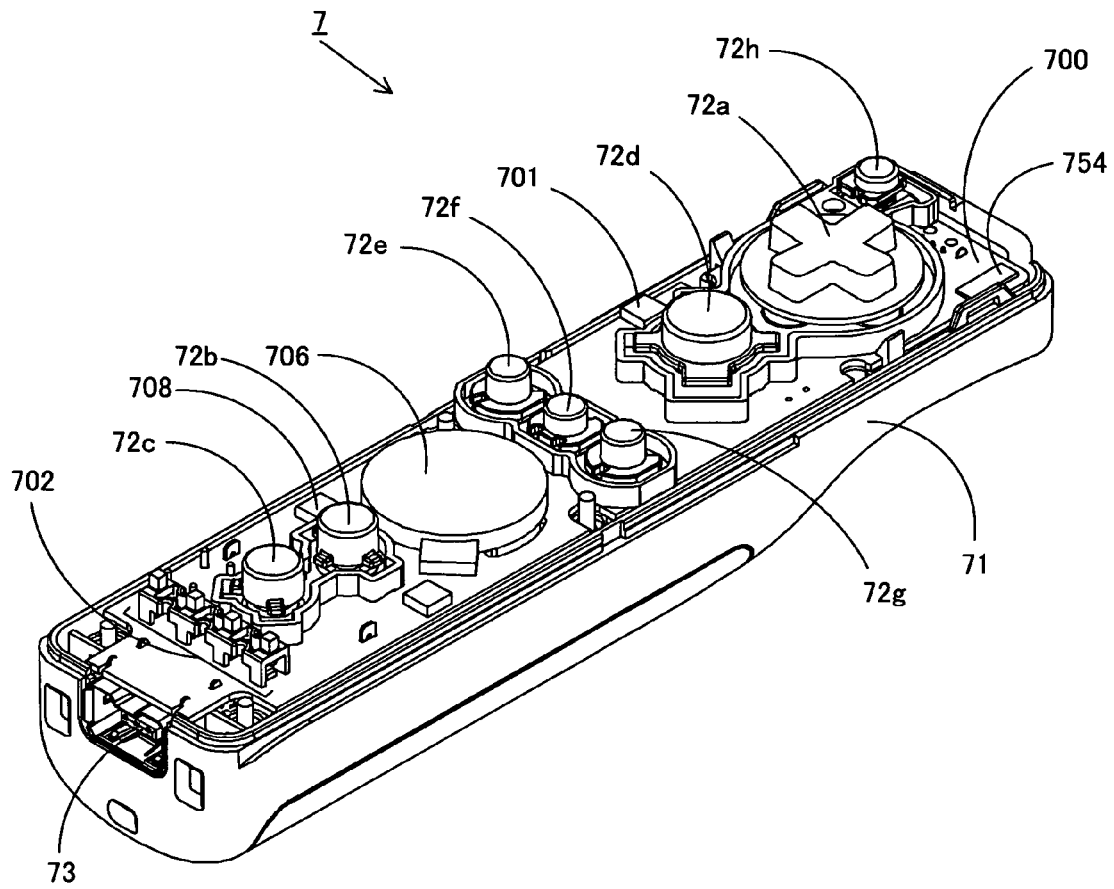
FIG. 5 is a perspective view of the controller 7 shown in FIG. 3 in a state where an upper housing thereof is removed.
Figure 6:
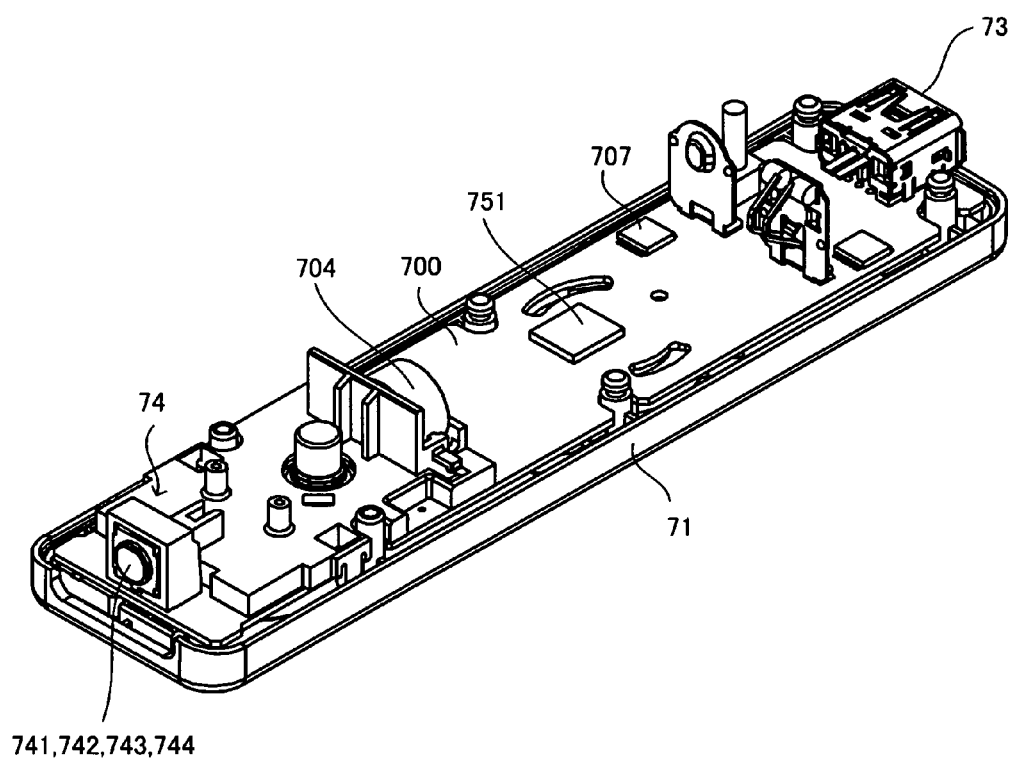
FIG. 6 is a perspective view of the controller 7 shown in FIG. 4 in a state where a lower housing thereof is removed.

With reference to FIGS. 5 and 6, an internal structure of the controller 7 will be described. FIG. 5 is a perspective view of the controller 7 as viewed from a rear side, the controller 6 being in a state where an upper housing (a part of the housing 71) of the controller 7 is removed. FIG. 6 is a perspective view of the controller 7 as viewed from a front side, the controller 7 being in a state where a lower housing (a part of the housing 71) of the controller 7 is removed. FIG. 6 is also a perspective view as viewed from a reverse side of the substrate 700 shown in FIG. 5.

As shown in FIG. 5, the substrate 700 is fixed inside the housing 71. Provided on a top main surface of the substrate 700 are the operation buttons 72a, 72b, 72c, 72d, 72e, 72f, 72g and 72h, an acceleration sensor 701, the LEDs 702, an antenna 754 and the like. These component parts are connected to a microcomputer 751 or the like (see FIGS. 6 and 7) by lines (not shown) formed on the substrate 700 or the like. The wireless module 753 (see FIG. 7) and the antenna 754 allow the controller 7 to act as a wireless controller. A quartz oscillator, which is not shown, is provided in an inside of the housing 71, and generates a reference clock of the microcomputer 751 described later. On the top main surface of the substrate 700, the loudspeaker 706 and an amplifier 708 are provided.

The acceleration sensor 701 is provided at the left side of the operation button 72d on the substrate 700 (that is, at a peripheral portion, instead of a center portion, on the substrate 700). Accordingly, the acceleration sensor 701 can detect, in accordance with a rotation centering on the longitudinal direction of the controller 7, acceleration caused by a centrifugal force element as well as directional variation in gravitational acceleration. Therefore, based on a predetermined calculation, the game apparatus body 5 and the like can detect, from the detected acceleration data, the motion of the controller 7 highly sensitively. For example, the controller 7 includes triaxial acceleration sensor 701. The triaxial acceleration sensor 701 detects linear acceleration in three directions, i.e., an up-down direction, a left-right direction and a front-rear direction. Data indicative of acceleration detected by the acceleration sensor 701 along the respective directions is outputted to the communication section 75.

As shown in FIG. 6, at a front edge of a bottom main surface of the substrate 700, the imaging information calculation section 74 is provided. The imaging information calculation section 74 includes an infrared filter 741, a lens 742, the image pick up element 743, and an image processing circuit 744, which are located in this order from the front side of the controller 7, and provided on the bottom main surface of the substrate 700. At a rear edge of the bottom main surface of the substrate 700, the connector 73 is attached. Further, on the bottom main surface of the substrate 700, a sound IC 707 and the microcomputer 751 are provided. The sound IC 707 is connected to the microcomputer 751 and the amplifier 708 by lines formed on the substrate 700 or the like, and outputs an audio signal to the loudspeaker 706 via the amplifier 708 in accordance with the audio data transmitted from the game apparatus body 5.

On the bottom main surface of the substrate 700, a vibrator 704 is attached. The vibrator 704 may be, for example, a vibration motor or a solenoid. The vibrator 704 is connected to the microcomputer 751 via the lines formed on the substrate 700 or the like, and an operation thereof is turned on/off in accordance with vibration data transmitted from the game apparatus body 5. The controller 7 is vibrated when the vibrator 704 is turned on, and vibration is conveyed to the player holding the controller. Thus, so-called a vibration-feedback game is realized. The vibrator 704 is located at a relatively front side of the housing 71, and thus the housing 71 vibrates to a large extent while the player is holding the housing 71, whereby the player feels vibration sensitively.

Figure 7:
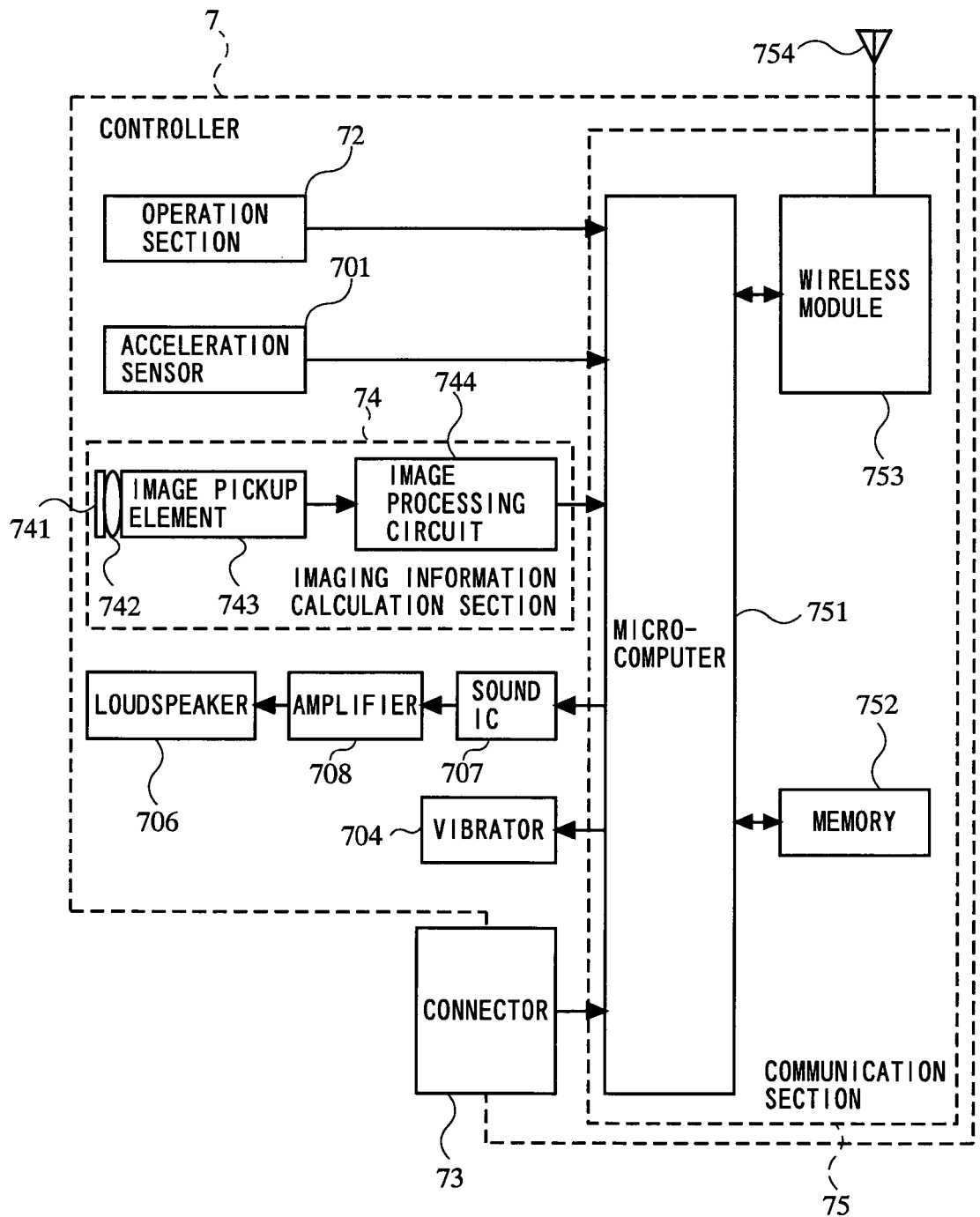
FIG. 7 is a block diagram showing a configuration of the controller 7 shown in FIG. 3.

With reference to FIG. 7, an internal configuration of the controller 7 will be described. FIG. 7 is a block diagram showing a configuration of the controller 7.

As shown in FIG. 7, the controller 7 includes thereinside a communication section 75, in addition to the operation sections 72, the imaging information calculation section 74, the acceleration sensor 701, the vibrator 704, the loudspeaker 706, the sound IC 707, and the amplifier 708 which are described as above.

The imaging information calculation section 74 includes the infrared filter 741, the lens 742, the image pickup element 743 and the image processing circuit 744. The infrared filter 741 allows only an infrared radiation to pass therethrough, the infrared radiation being included in the light which is incident on the front side of the controller 7. The lens 742 converges the infrared radiation which has passed through the infrared filter 741, and outputs the infrared radiation to the image pickup element 743. The image pickup element 743 is a solid-state image pickup element such as a CMOS sensor or a CCD, and picks up an images of the infrared radiation converged by the lens 742. In other words, the image pickup element 743 picks up the image of only the infrared radiation having passed through the infrared filter 741, and generates image data. The image data generated by the image pickup element 743 is processed by the image processing circuit 744. Specifically, the image processing circuit 744 processes the image data obtained from the image pickup element 743 and detects a high brightness point thereof, and outputs, to the communication section 75, a process result data indicative of a result of the detection of a position of the high brightness point. The imaging information calculation section 74 is fixed on the housing 71 of the controller 7, and an imaging direction of the housing 71 can be changed by changing the orientation of the housing 71.

The communication section 75 includes the microcomputer 751, a memory 752, the wireless module 753 and the antenna 754. The microcomputer 751 controls the wireless module 753 for wirelessly transmitting the transmission data while using the memory 752 as a storage area at the time of processing. Further, the microcomputer 751 controls operations of the sound IC 707 and the vibrator 704 in accordance with the data received by the wireless module 753 from the game apparatus body 5 via the antenna 754. The sound IC 707 processes the sound data and the like transmitted from the game apparatus body 5 via the communication section 75. Further, the microcomputer 751 actuates the vibrator 704 in accordance with the vibration data (e.g., signal for turning the vibrator 7040N or OFF) and the like which are transmitted from the game apparatus body 5 via the communication section 75.

Data from the controller 7 such as an operation signal (key data) from the operation section 72, acceleration signals (acceleration data) in three axes directions from the acceleration sensor 701, and the process result data from the imaging information calculation section 74 are outputted to the microcomputer 751. The microcomputer 751 temporarily stores the inputted data (the key data, the acceleration data, and the process result data) in the memory 752 as the transmission data to be transmitted to the wireless controller module 19. The wireless transmission from the communication section 75 to the wireless controller module 19 is performed at predetermined time intervals. Since the game process is generally performed at an interval of 1/60 sec., the wireless transmission needs to be performed at an interval of a shorter time period. Specifically, the game process is performed at an interval of 16.7 ms (1/60 sec.), and a transmission interval of the communication section 75, which is configured with the Bluetooth®, is 5 ms, for example. At a timing of performing a transmission to the wireless controller module 19, the microcomputer 751 outputs the transmission data stored in the memory 752 to the wireless module 753 as a series of pieces of operation information. Based on the Bluetooth® technology, for example, the wireless module 753 emits, from the antenna 754, a radio signal indicative of the operation information by using a carrier wave having a predetermined frequency. Thus, the key data from the operation section 72, the acceleration data from the acceleration sensor 701, and the process result data from the imaging information calculation section 74 are transmitted from the controller 7. The radio signal is received by the wireless controller module 19 of the game apparatus body 5, and the radio signal is then demodulated or decoded in the game apparatus body 5, whereby the series of pieces of operation information (the key data, the acceleration data and the process result data) are obtained. The CPU 10 of the game apparatus body 5 performs the game process in accordance with the obtained operation information and the game program. In the case where the communication section 75 is configured with the Bluetooth® technology, the communication section 75 may have a function of receiving transmission data which is wirelessly transmitted from other devices.

In order to play a game on the game system 1 by using the controller 7, a user holds the controller 7 by one hand (e.g., the right hand). The user then holds the controller 7 such that the front surface (an entrance side on which light picked up by the imaging information calculation section 74 is incident) of the controller 7 faces the monitor 2. On the other hand, in the proximity of the display screen of the monitor 2, two markers 8L and 8R are arranged (see FIG. 1). The markers 8L and 8R each outputs the infrared radiation forward from the monitor 2, and constitutes an imaging target of the imaging information calculation section 74.

Figure 8:
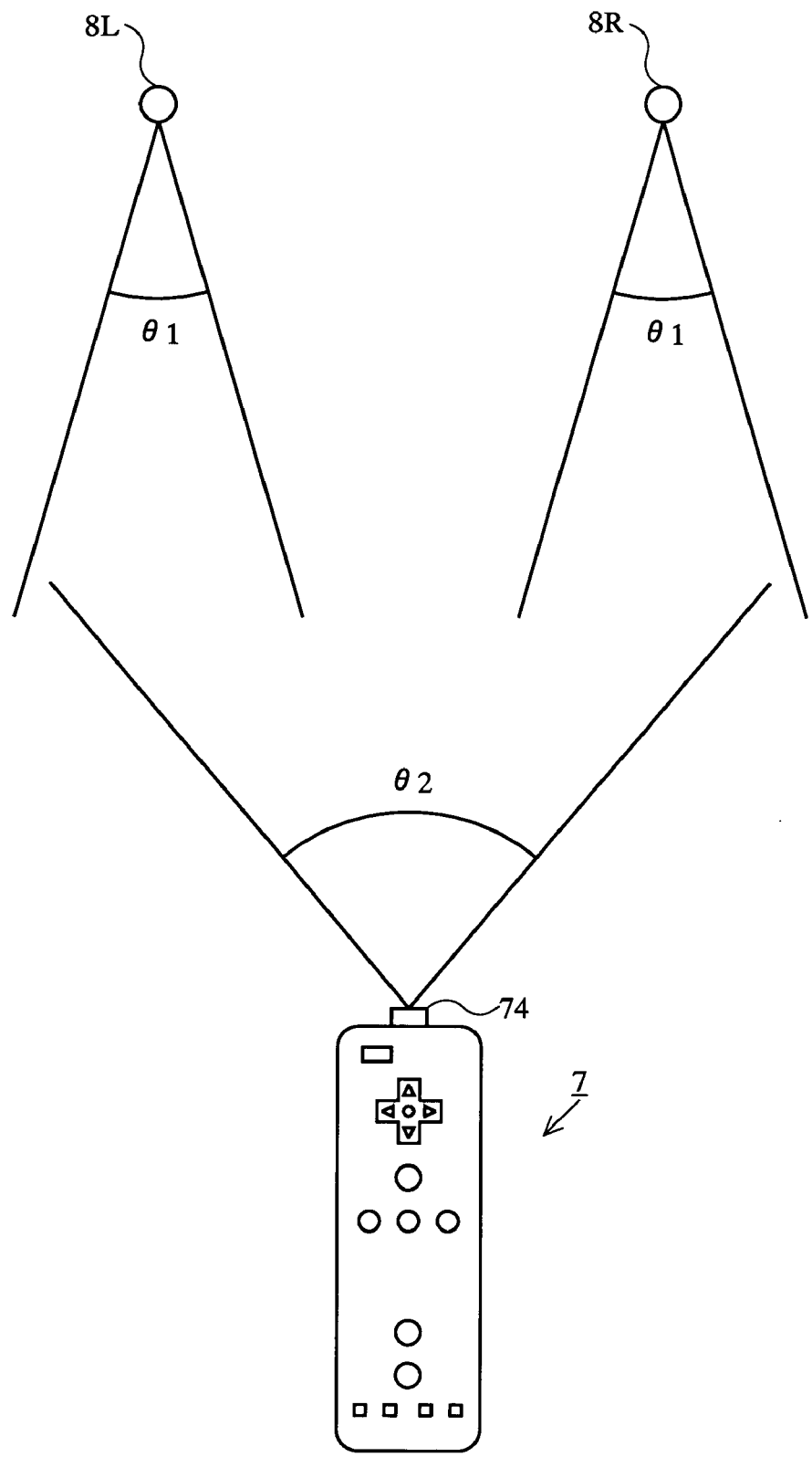
FIG. 8 is a diagram illustrating viewing angles of markers 8L and 8R, and an imaging information calculation section 74.

As shown in FIG. 8, the markers 8L and 8R each has a viewing angle of θ1. The image pickup element 743 has a viewing angle of θ2. For example, the viewing angle θ1 of each of the markers 8L and 8R is 34° (a half value angle), and the viewing angle θ2 of the image pickup element 743 is 41°. If the markers 8L and 8R are located within the viewing angle θ2 of the image pickup element 743, and the image pickup element 743 is located within the viewing angle θ1 of the marker 8L and within the viewing angle θ1 of the marker 8R, the game apparatus body 5 calculates a position pointed by the controller 7 by using position data relating to the high brightness point generated by the markers 8L and 8R.

When the user holds the controller 7 such that the front surface thereof faces the monitor 2, the infrared radiations outputted from each of the markers 8L and 8R are incident on the imaging information calculation section 74. The image pickup element 743 picks up images of the incident infrared radiations via the infrared filter 741 and the lens 742, and the image processing circuit 744 processes the picked up images. In the imaging information calculation section 74, components of the infrared radiation outputted from each of the markers 8L and 8R are detected, whereby positional information (positions of target images) and the like of the markers 8L and 8R in the picked up image are obtained. Specifically, the image processing circuit 744 analyzes the image data picked up by the image pickup element 743, eliminates, from area information of the picked up image, images which are not generated by the infrared radiations outputted from the markers 8L and 8R, and then determines the high brightness points as the positions of the markers 8L and 8R. The imaging information calculation section 74 obtains positional information such as barycentric positions of the determined high rightness points, and outputs the positional information as the process result data. The positional information, which is the process result data, may be outputted as coordinate values whose origin point is set to a predetermined reference point on the picked up image (e.g., the center or the left top corner of the picked up image). Alternatively, a brightness point position at a predetermined timing may be set as a reference point position, and a difference between the reference point position and a current brightness point position may be outputted as a vector. That is, in the case where a predetermined reference point is set on the image picked up by the image pickup element 743, the positional information of the target images is used as parameters representing differences between the positions of the target images and the reference point position. The positional information is transmitted to the game apparatus body 5, whereby, based on the difference between the reference point position and the positional information, the game apparatus body 5 is capable of obtaining variations in signals which corresponds to a movement, an attitude, a position and the like of the imaging information calculation section 74, i.e., the controller 7 with respect to the markers 8L and 8R. Specifically, when the controller 7 is moved, the high brightness point position on an image transmitted from the communication section 75 changes. Therefore, by inputting a direction or a coordinate point in accordance with a change in the high brightness point position, a position pointed by the controller 7 is considered as an operation input, and a direction or a coordinate point can be inputted in accordance with a moving direction of the controller 7. In an exemplary operation in display control processing to be described later, the imaging information calculation section 74 at least obtains the coordinate points of the barycenteric positions of the respective target images of the markers 8L and 8R on the picked up images, and outputs the obtained coordinate points as the process result data.

In this manner, the imaging information calculation section 74 of the controller 7 picks up the markers (the infrared radiations from the markers 8L and 8R in the embodiment) which is located fixedly, whereby data outputted from the controller 7 is processed in the game process on the game apparatus body 5, and an operation can be performed in accordance with the movement, the attitude, the position and the like of the controller 7. Further, it becomes possible to perform an intuitive operation input which is different from an input by pressing the operation button and the operation key. Since the above-described markers are located in the proximity of the display screen of the monitor 2, a position of the controller 7 with respect to the markers can be easily converted to the movement, the attitude, position and the like of the controller 7 with respect to the display screen of the monitor 2. That is, the process result data based on the movement, the attitude, the position and the like of the controller 7 is used as the operation input directly reflected on the display screen of the monitor 2 (e.g., inputting a position pointed by the controller 7).

Figure 9:
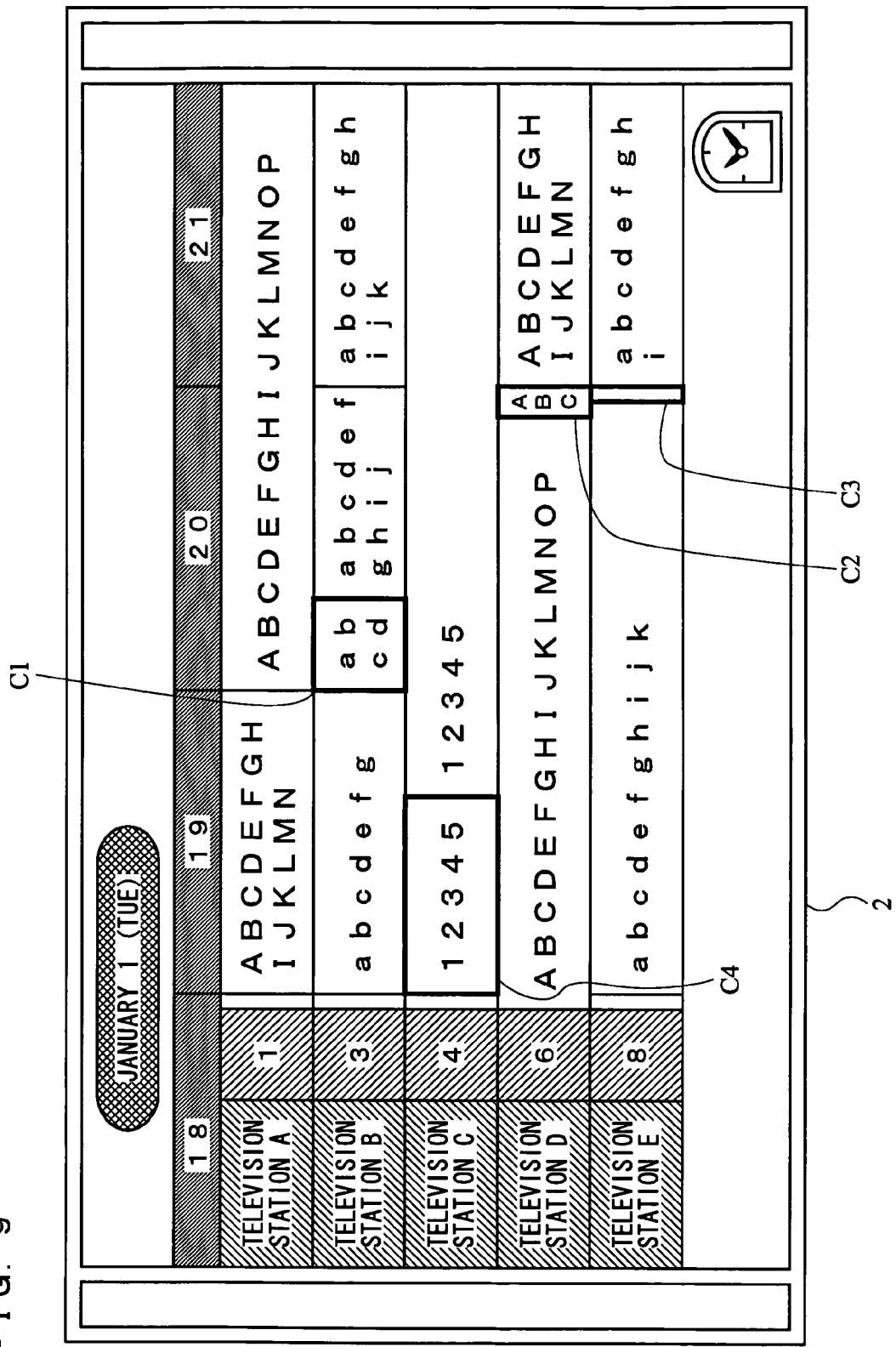
FIG. 9 is an exemplary screen showing a first example of a broadcast listing displayed on a monitor 2.
Figure 10:
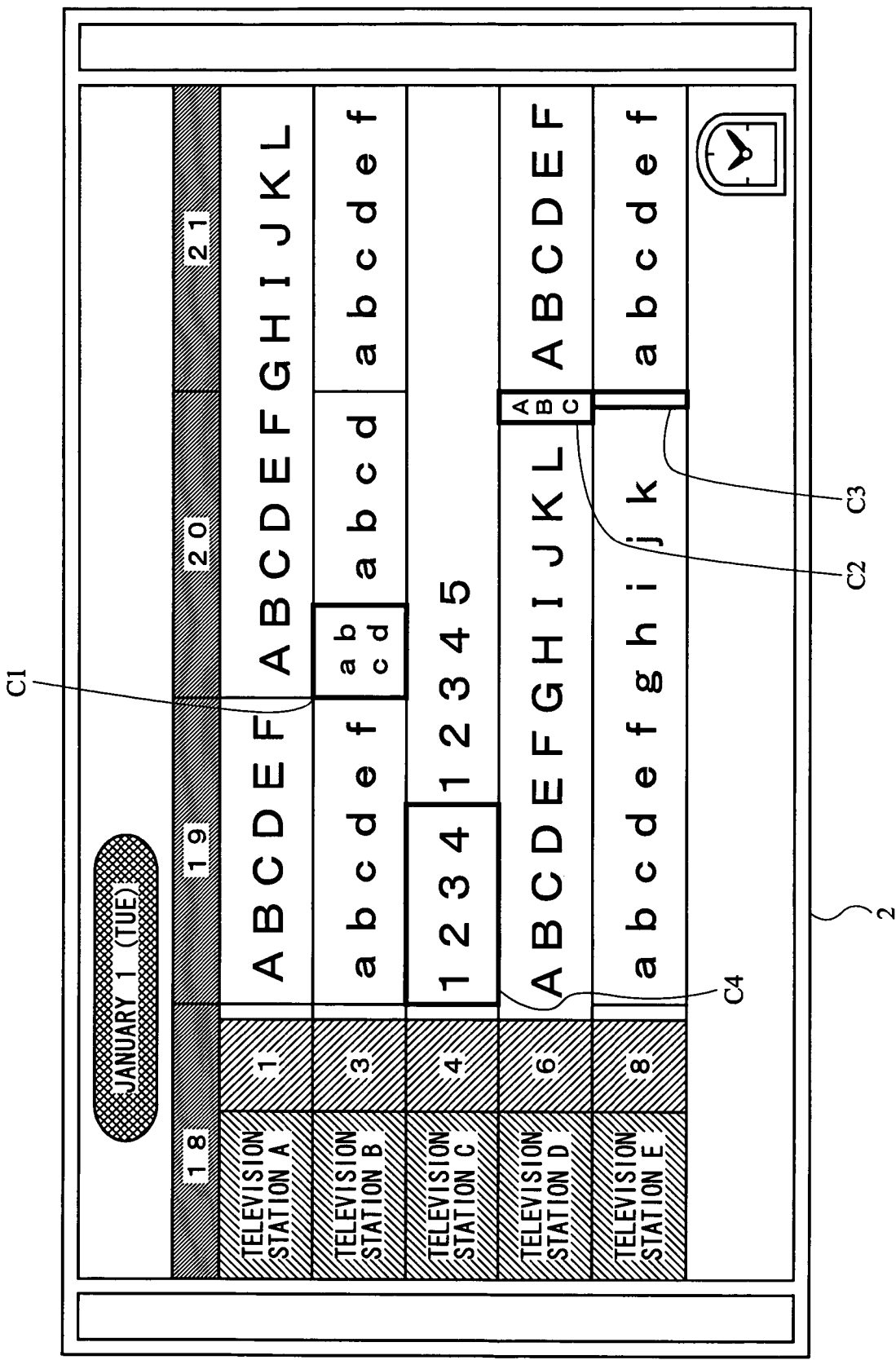
FIG. 10 is another exemplary screen showing a second example of the broadcast listing displayed on the monitor 2.
Figure 11:
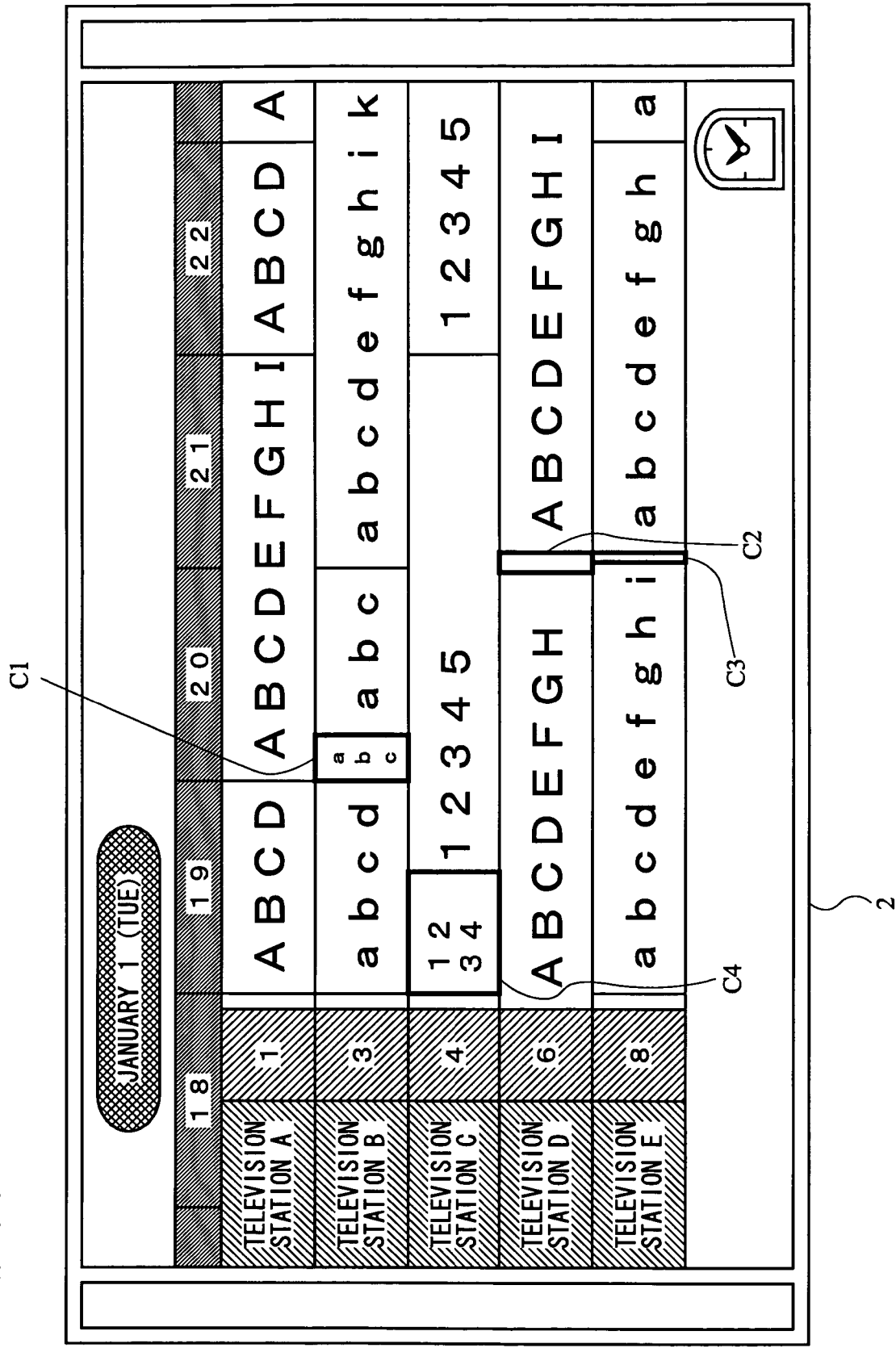
FIG. 11 is another exemplary screen showing a third example of the broadcast listing displayed on the monitor 2.

With reference to FIGS. 9 to 11, exemplary screen displayed on the monitor 2 in accordance with the user's operation will be described. FIG. 9 is an exemplary screen illustrating a first example of a broadcast listing displayed on the monitor 2. FIG. 10 is another exemplary screen illustrating a second example of the broadcast listing displayed on the monitor 2. FIG. 11 is another exemplary screen illustrating a third example of the broadcast listing displayed on the monitor 2.

As shown in each of FIGS. 9 to 11, the broadcast listing is displayed on the monitor 2 in a matrix form, where a horizontal axis represents a time axis, and a vertical axis represents a broadcast station axis. Specifically, broadcast cells corresponding to time frames, in which television stations broadcast respective broadcasts, are set respectively, and a broadcast title is described in characters in each of the broadcast cells. By pressing a predetermined button of the controller 7, or changing a position pointed with the controller 7, the user can change a character size of the broadcast title, scroll the broadcast listing, and expand or shorten a length of the time axis. For example, when the user presses the operation button 72b (No. 1 button) or the operation button 72c (No. 2 button), the character size of the broadcast title is changed. When the user presses the operation button 72e (minus button) or the operation button 72g (plus button), the length of the time axis of a displayed broadcast listing is expanded or shortened. Further, when the user moves the position pointed with the controller 7 while pressing the operation button 72i, or when the user presses the operation button 72a (cross key), the broadcast listing is scroll-displayed.

For example, as shown in FIG. 9, a broadcast listing is displayed in which the time axis shows three hourly time frames, respectively staring from 19, 20 and 21 hours, and the broadcast station axis shows five television stations A, B, C, D and E. As to the display mode shown in FIG. 9, the user sets the character size displayed on the screen to "small". Accordingly, most of the broadcast titles displayed in the broadcast cells of the respective television stations are each displayed in a "small" character size from the first character of each of the broadcast titles. For example, in a broadcast cell of the television A broadcasted during an hourly time frame starting from 19 hours, a broadcast title "ABCDEFGHIJKLMN" is described in the "small" character size. In the present embodiment, the user can select the character size from three types of character sizes, i.e., "large", "medium", and "small". Although the user cannot select a "extra small" character size, which is smaller than the "small" character size, the "extra small" is set as a character size to be displayed.

When broadcast cells C2 and C3 shown in FIG. 9 are focused, a broadcast title "ABC" is described in the broadcast cell C2 in the "extra small" character size, which is smaller than the "small" character size. This is because, as a rule, at least three characters of a broadcast title to be displayed on the monitor 2 need to be described in the broadcast cell. Specifically, when the "small" character size is used, the broadcast title cannot be displayed at least in the three characters in the broadcast cell C2. When the "extra small" character size is used, it is possible to vertically display the broadcast title in the three characters. In this case, even if the user selects the "small" character size, the broadcast title is described in the "extra small" character size in the broadcast cell C2. In the broadcast cell C3, on the other hand, no broadcast title is described. This is because the broadcast cell C3 is so small that the broadcast title cannot be described in three characters even if the "extra small" character size is used. In this case, even if the user selects the "small" character size, no broadcast title is described in the broadcast cell C3.

Also in FIG. 10, the broadcast listing is displayed in which the time axis shows three hourly time frames, respectively staring from 19, 20 and 21 o'clocks, and the broadcast station axis shows five television stations A, B, C, D and E. As to the display mode shown in FIG. 10, the user sets the character size displayed on the screen to "large". Accordingly, most of the broadcast titles displayed in the broadcast cells of the respective television stations are each displayed in a large character size from the first character of each of the broadcast titles. For example, in a broadcast cell of the television A broadcasted during an hourly time frame starting from 19 o'clock, a broadcast title "ABCDEF", which is the first 6 characters of the full broadcast title "ABCDEFGHIJKLMN", is described in the "large" character size. In this manner, in the broadcast listing of the present embodiment, in accordance with the character size selected by the user, only characters of the broadcast title which are drawable within the broadcast cell are displayed from the first character of the broadcast title.

Now, broadcast cells C1 to C3 shown in each of FIGS. 9 and 10 will be paid attention. When the user selects the "small" character size, four characters of a broadcast title "abcd" are displayed in the "small" character size in the broadcast cell C1 (FIG. 9). On the other hand, even if the user selects the "large" character size, four characters of the broadcast title "abcd" are displayed in the "small" character size in the broadcast cell C1 (FIG. 10). This is also because, as the rule, at least three characters of a broadcast title to be displayed on the monitor 2 need to be described in the broadcast cell. Specifically, the broadcast cell C1 is of a size in which three characters cannot be described in the "large" character size or in the "medium" character size, and instead, is of a size in which four characters can be described in the "small" character size. In this case, even if the user selects the "medium" character size or the "large" character size, the broadcast title is described in the "small" character size in the broadcast cell C1. Further, even if the user selects the "large" character size, the broadcast title "ABC" is described in "extra small" character size in the broadcast cell C2 (FIG. 10). Still further, even if the user selects the "large" character size, no broadcast title is described in the broadcast cell C3 (FIG. 10).

As shown in FIG. 11, the broadcast listing is displayed while a length of each of the hourly time frames along the time axis is shortened compared with that shown in FIGS. 9 and 10. That is, the number of hourly time frames of the broadcast listing is increased. Specifically, the broadcast listing is displayed in which the time axis shows four hourly time frames respectively starting from 19, 20, 21 and 22 o'clocks and the broadcast station axis shows five television station A, B, C, D and E. As to the display mode shown in FIG. 11, the user sets the character size to be displayed to "large", as with the case shown in FIG. 10. Accordingly, the broadcast cell of each of the television station is shortened horizontally, and most characters of the broadcast titles described in the respective broadcast cells are each described in the "large" character size from the first character of each of the broadcast titles. For example, in a broadcast cell of the television A broadcasted during an hourly time frame starting from 19 o'clock, a broadcast title "ABCD", which is the first four characters of the broadcast title "ABCDEFGHIJKLMN", is described in the "large" character size. In this manner, in the broadcast listing of the present embodiment, in accordance with the character size and a time axis scale selected by the user, only drawable number of characters of the broadcast title are displayed in the broadcast cell from the first character of the broadcast title.

Now, broadcast cells C1 to C4 shown in each of FIGS. 9 and 10 will be focused. As shown in each of FIGS. 9 and 10, before the hourly time frames along the time axis are shortened, four characters of the broadcast title "abcd" are described in the "small" character size in the broadcast cell C1. On the other hand, as shown in FIG. 11, after the user has shortened the hourly time frames along the time axis, three characters of the broadcast title "abc" are described in the "extra small" character size in the broadcast cell C1. This is also because, as the rule, at least three characters of a broadcast title to be displayed on the monitor 2 need to be described in the broadcast cell. Specifically, after the hourly time frames along the time axis are shortened, the broadcast cell C1 becomes small enough that said at least three characters of the broadcast title cannot be described in any of the "small", "medium" and "large" character sizes. Instead, when the "extra small" character size is used, three characters can be described vertically. In this case, regardless of the character size selected by the user, the broadcast title is described in the "extra small" character size in the broadcast cell C1. As shown in FIG. 11, after the user has shortened the hourly time frames along the time axis, no broadcast title is described in either of the broadcast cells C2 or C3. That is, after the hourly time frames along the time axis are shortened, the broadcast cells C2 and C3 become small enough that said at least three characters of the broadcast title cannot be described even if the "extra small" character size is used. In this case, regardless of the character size selected by the user, no broadcast title is described in none of the broadcast cells C2 and C3. Further, as shown in FIGS. 9 and 10, before the hourly time frames along the time axis are shortened, a broadcast title "12345" composed of five characters is described in the "small" character size, and a broadcast title "1234" having four characters is described in the "large" character size in respective broadcast cells C4. On the other hand, as shown in FIG. 11, after the hourly time frames along the time axis are shortened by the user, the broadcast title "1234" having four characters are described in the "small" character size in the broadcast cell C4. After the hourly time frames along the time axis are shortened, the broadcast cell C4 becomes of a size in which three characters cannot be described in the case of the "large" or "medium" character size, whereas four characters can be described in the case of the "small" character size. In this case, even if the user selects the "large" or "medium" character size, the broadcast title is described in the "small" character size in the broadcast cell C4.

Figure 12:
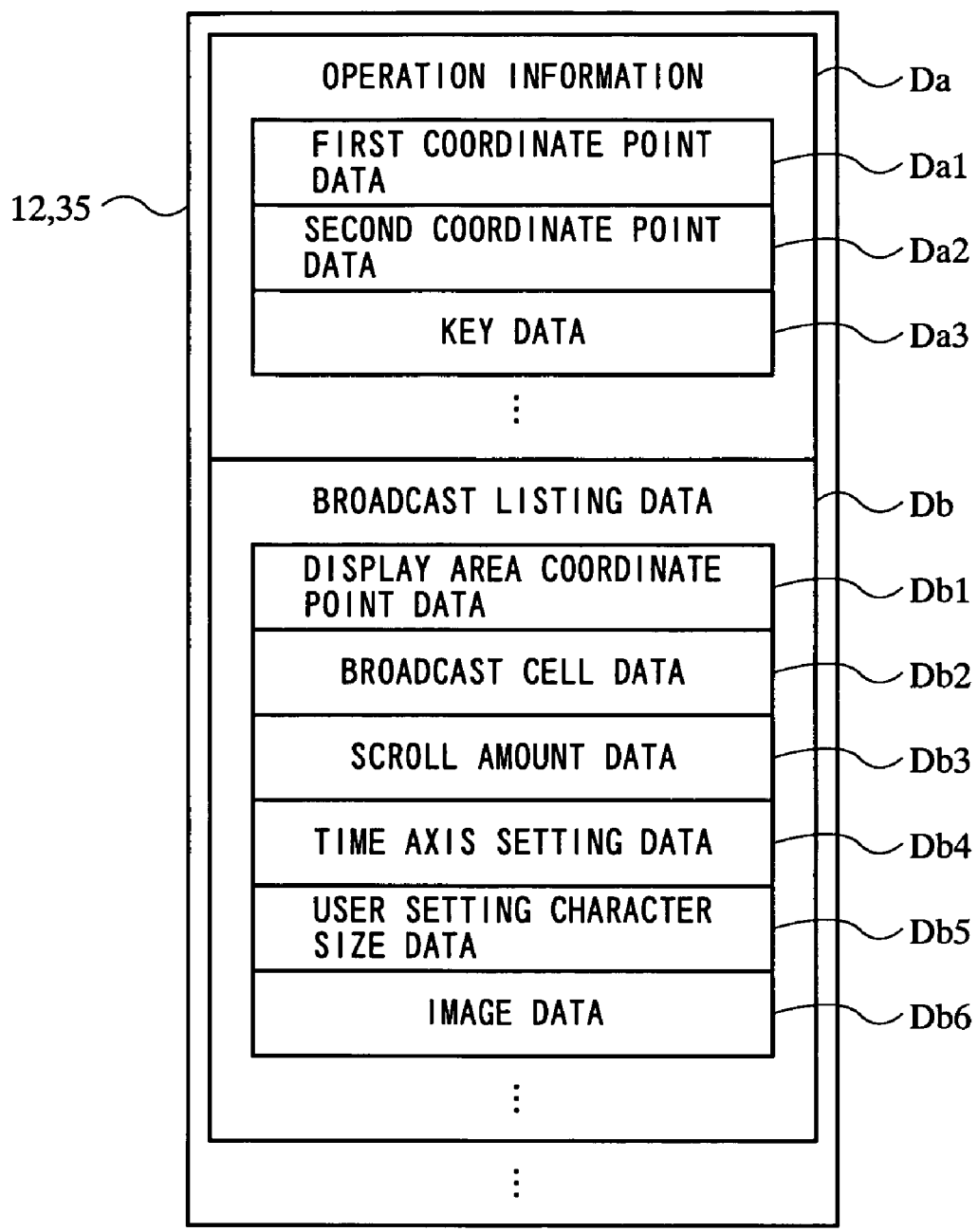
FIG. 12 is a diagram showing exemplary major data stored in a main memory of the game apparatus body 5.

Next, the game process performed on the game system 1 will be described in detail. With reference to FIGS. 12 and 13, major data used in the game process will be described. FIG. 12 is a diagram showing an example of the major data stored in the external main memory 12 and/or internal main memory 35 (hereinafter collectively referred to as a main memory) of the game apparatus body 5. FIG. 13 is a diagram showing, in detail, an exemplary content of broadcast cell data Db2 shown in FIG. 12.

As shown in FIG. 12, operation information Da, broadcast listing data Db and the like are stored in the main memory. In the main memory, in addition to the data included in the information shown in FIG. 12, data necessary for information processing and display control processing is stored as appropriate.

The operation information Da stores therein the series of pieces of operation information (the key data, the acceleration data and the process result data) transmitted from the controller 7 as the transmission data, and the operation data is updated to latest operation information. The operation information Da includes first coordinate point data Da1 and second coordinate point data Da2 which correspond to the positional information of the process result data. The first coordinate point data Da1 represents data indicative of a position of the image of either of the markers 8L and 8R with respect to the image picked up by the image pickup element 743 (a position within the picked up image). The second coordinate point data Da2 represents data indicative of a position of the image (a position within the picked up image) of the other marker. For example, the positions of the images of the markers in the picked up image is represented by an xy coordinate system in the picked up image.

The operation information Da includes key data Da3 and the like obtained from the operation section 72, in addition to the coordinate point data (the first coordinate point data Da1 and the second coordinate point data Da2), which is exemplary process result data obtained from the picked up image. The wireless controller module 19 provided in the game apparatus body 5 receives the series of pieces of operation information transmitted from the controller 7 at a predetermined interval of 5 ms, for example, and stores the operation information in a buffer (not shown) provided in the wireless controller module 19. The latest operation information stored in the buffer is read at an interval of one frame (e.g., 1/60 sec.), which is an interval of the game process, and the operation information Da stored in the main memory is updated.

The broadcast listing data Db stores therein information for displaying the broadcast listing on the monitor 2. The broadcast listing data Db includes display area coordinate point data Db1, broadcast cell data Db2, scroll amount data Db3, time axis setting data Db4, user setting character size data Db5, image data Db6, and the like.

The display area coordinate point data Db1 stores therein coordinate point data indicative of a position of a display area, in the broadcast listing, to be displayed on the monitor 2 (e.g., positions of a left top corner and a right bottom corner of the display area). The broadcast cell data Db2 stores therein data indicative of information on respective broadcast cells included in the broadcast listing, which will be described later in detail. The scroll amount data Db3 stores therein data indicative of an amount and a direction of scrolling the broadcast listing, the amount and direction being set by the user's operation input. The time axis setting data Db4 stores therein data indicative of a time axis scale of the broadcast listing, the time axis scale being set by the user's operation input. The user setting character size data Db5 stores therein data indicative of the character size of the broadcast listing, the character size being set by the user's operation input. The image data Db6 stores therein data indicative of various images so as to display the broadcast listing on the monitor 2.

As shown in FIG. 13, information included in the broadcast cell data Db2 is updated as appropriate by using electronic broadcast listing data which is obtained through communication with various servers connected to the network via the wireless communication module 18 and the antenna 22. The broadcast cell data Db2 is set for each of the broadcast cells arranged in the broadcast listing. The broadcast cell data Db2 includes a broadcast cell number Db2a, broadcast title character string data Db2b, number-of-broadcast-title-characters data Db2c, television station data Db2d, broadcast cell coordinate point data Db2e, drawing area width data Db2f, drawing area height data Db2g, drawing character size data Db2h, drawable-number-of-lines data Db2i, drawable-number-of-characters data Db2j and the like with respect to each of the broadcast cells.

The broadcast cell number Db2a stores therein sequential numbers which are each set for each of the broadcast cells (e.g., broadcast cell number "1" as shown in FIG. 13). The broadcast title character string data Db2b stores therein character string data indicative of the broadcast title (e.g., broadcast title character string "ABCDEFGH" as shown in FIG. 13) to be described in each of the broadcast cells. The number-of-broadcast-title-characters data Db2c stores therein the number of characters of the broadcast title in each of the broadcast cells (e.g., the number of the broadcast characters "8" as shown in FIG. 13). The television station data Db2d stores therein data indicative of the television station allocated to each of the broadcast cells (e.g., television "A" shown in FIG. 13). The broadcast cell coordinate point data Db2e stores therein data indicative of a position of each of the broadcast cells in the broadcast listing (e.g., a left top corner coordinate point (xsa, ysa) and a right bottom corner coordinate point (xsb, ysb) shown in FIG. 13). The drawing area width data Db2f stores therein data indicative of a drawing area width of each of the broadcast cells, the width in which the broadcast title is drawable (e.g., a drawing area width "dw" shown in FIG. 13). The drawing area height data Db2g stores therein a drawing area height of each of the broadcast cells, the height in which the broadcast title is drawable (e.g., a drawing area height "dh" shown in FIG. 13). The drawing character size data Db2h stores therein data indicative of the size of the characters of the broadcast title to be described in each of the broadcast cells (e.g., the "medium" character size shown in FIG. 13). The drawable-number-of-lines data Db2i stores therein data indicative of the number of lines in each of the broadcast cells, the lines on which the broadcast title is drawable (e.g., the drawable number of lines "2" shown in FIG. 13). The drawable-number-of-characters data Db2j stores therein data indicative of the number of characters of the broadcast title drawable in each of the broadcast cell (e.g., the drawable number of characters "4" shown in FIG. 13).

Figure 14:
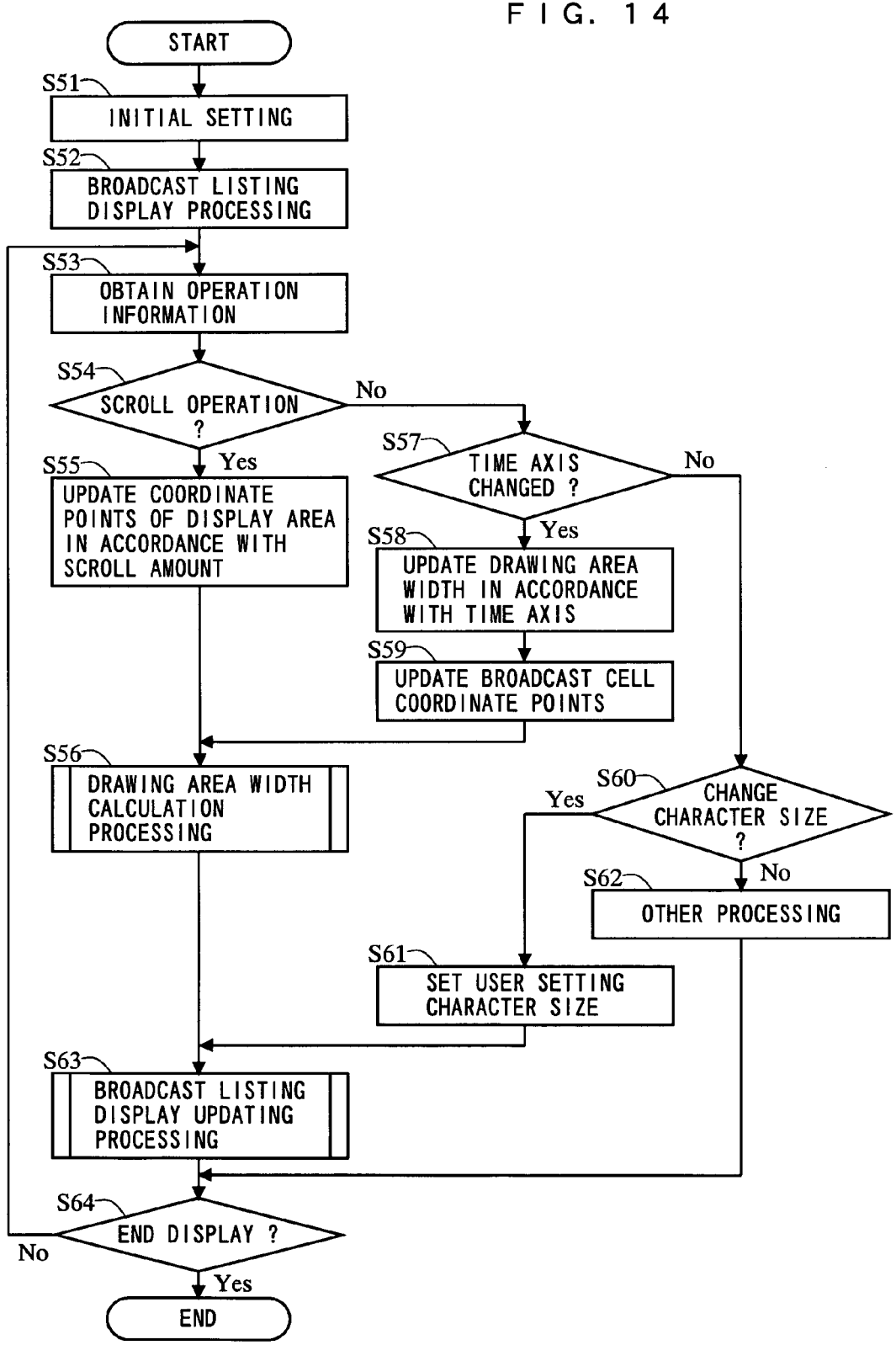
FIG. 14 is a flowchart showing a flow of display control processing performed on the game apparatus body 5.
Figure 15:
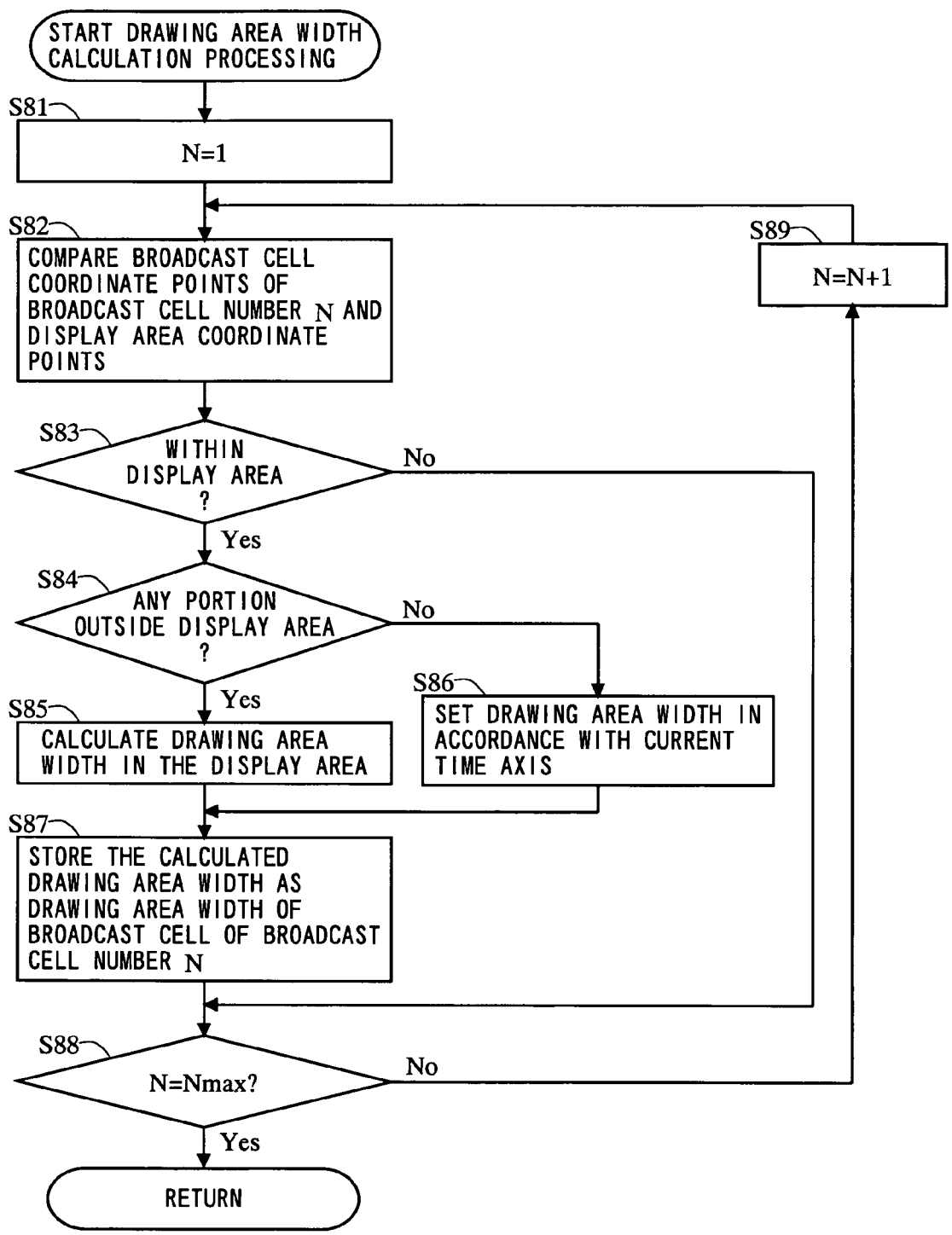
FIG. 15 is a sub-routine showing, in detail, an operation of drawing area width calculation processing in step 56 shown in FIG. 14.
Figure 16:
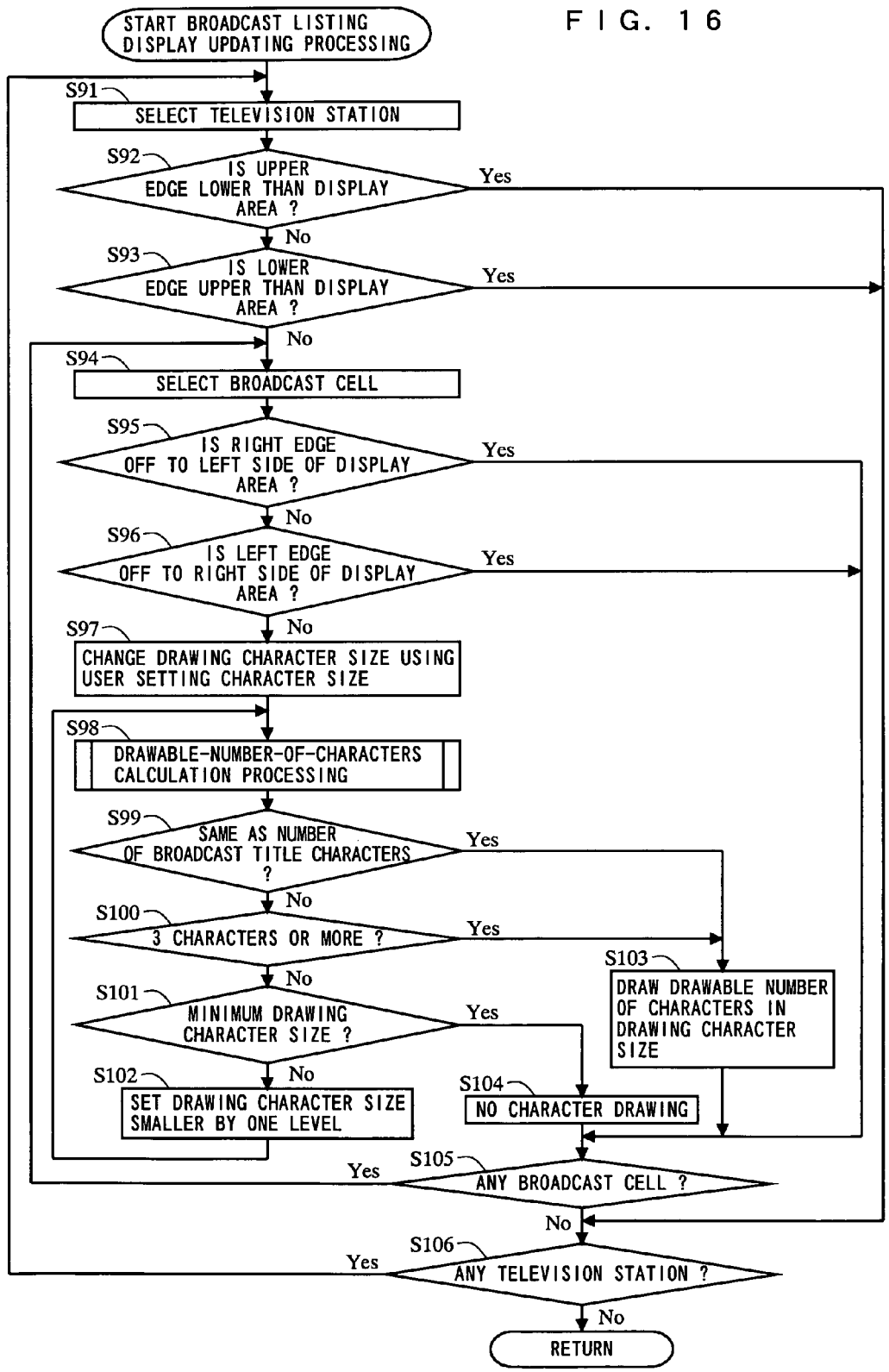
FIG. 16 is a sub-routine showing, in detail, an operation of broadcast listing display updating processing in step 63 shown in FIG. 14.
Figure 17:
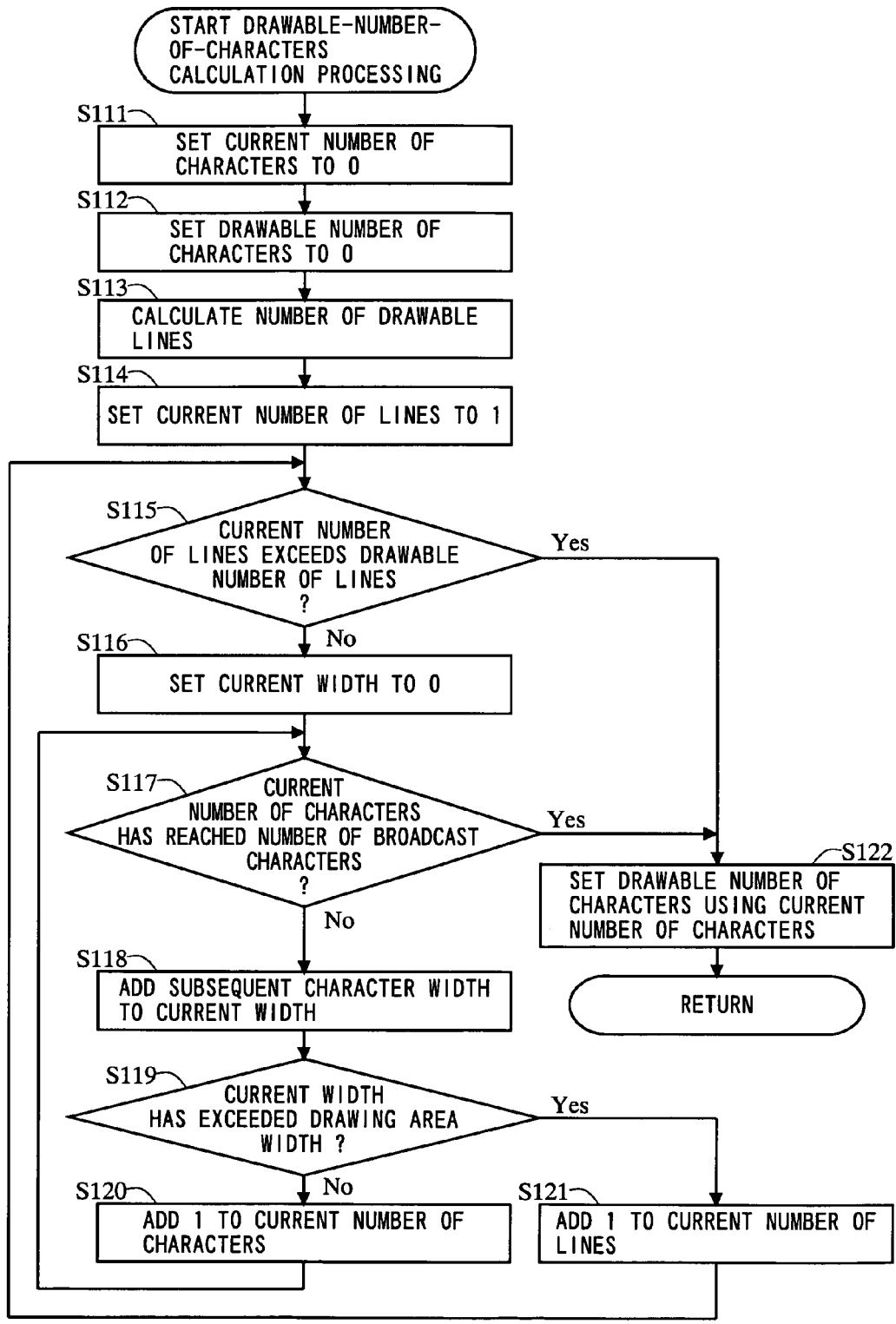
FIG. 17 is a sub-routine showing, in detail, an operation of drawable-number-of-characters calculation processing in step 98 shown in FIG. 16.
Figure 18:
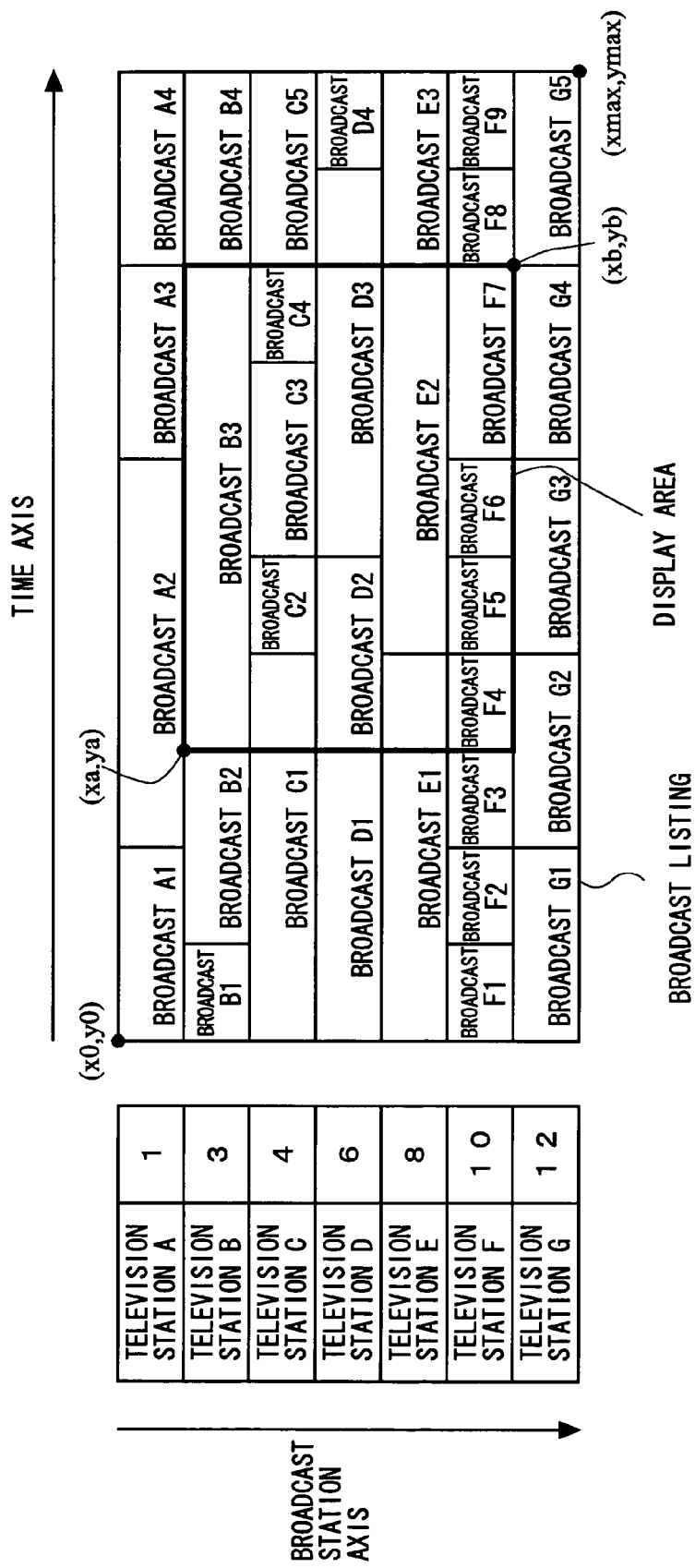
FIG. 18 is a diagram illustrating an exemplary setting of a display area of a broadcast listing.
Figure 19:
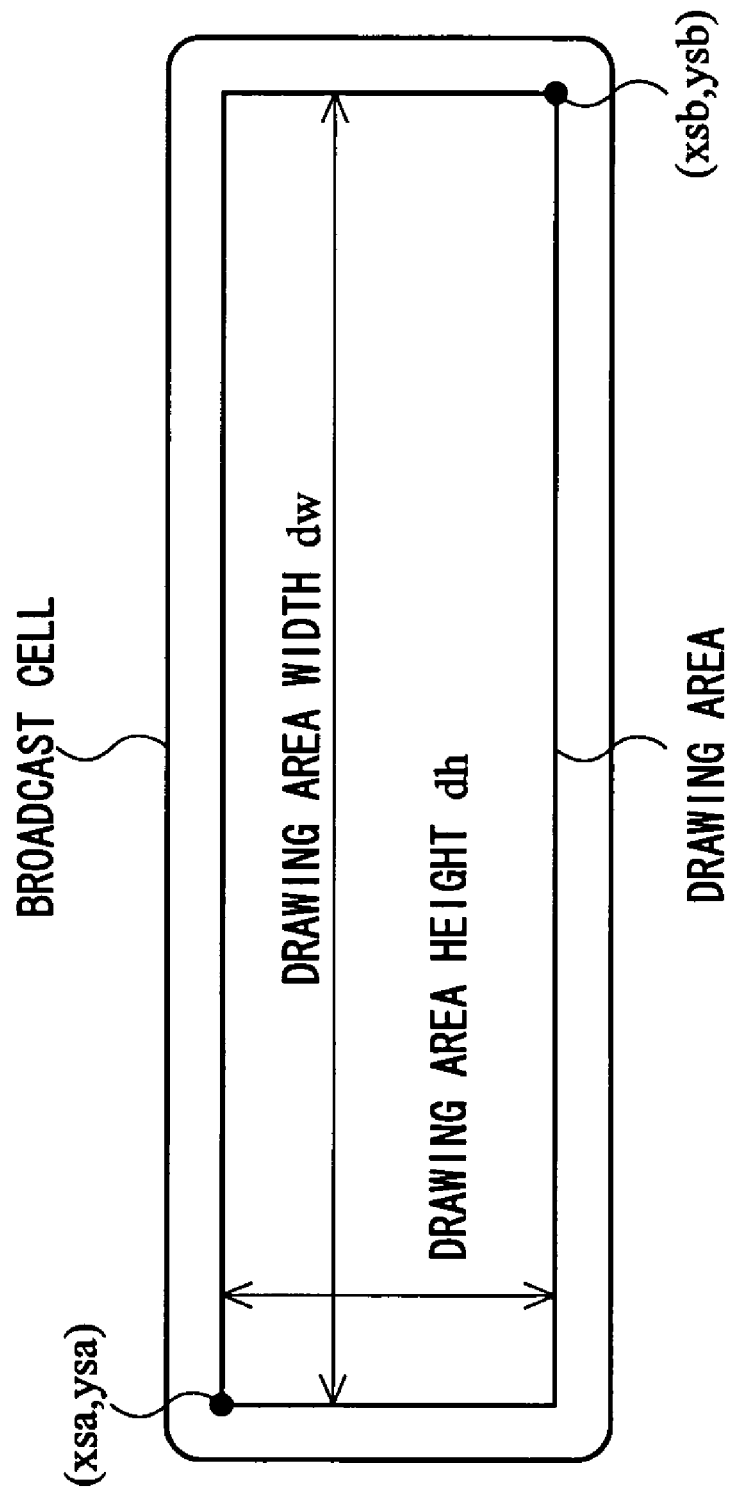
FIG. 19 is a diagram illustrating exemplary settings of a drawing area width dw and a drawing area height dh which are set in a broadcast cell.

With reference to FIGS. 14 to 20, the display control processing performed on the game apparatus body 5 will be described in detail. FIG. 14 is a flowchart showing a flow of the display control processing performed on the game apparatus body 5. FIG. 15 is a sub-routine showing, in detail, an operation of the drawing area width calculation processing in step 56 shown in FIG. 14. FIG. 16 is a sub-routine showing, in detail, an operation of broadcast listing display updating processing in step 63 shown in FIG. 14. FIG. 17 is a sub-routine showing, in detail, an operation of the drawable-number-of-characters calculation processing in step 98 shown in FIG. 16. FIG. 18 is a diagram illustrating an exemplary setting of the display area of the broadcast listing. FIG. 19 is a diagram illustrating exemplary settings of the drawing area width dw and the drawing area height dh set for each of the broadcast cells. FIG. 20 is a diagram illustrating exemplary settings of the drawing area width dw and the drawing area height dh which are set in the case where a portion of the broadcast cell stays within the display area. In each of the flowcharts shown in FIGS. 14 to 17, processing of displaying, on the monitor 2, characters in the broadcast cell, among the display control processing, will be mainly described. Description of other processing not directly relating to the present invention will be omitted. As shown in FIGS. 14 to 17, each step executed by the CPU 10 is abbreviated as "S".

When the power button 24 of the game apparatus body 5 is turned on, the CPU 10 of the game apparatus body 5 executes the start-up program stored in the ROM/RTC 13, whereby respective component units such as the main memory are initialized. The display control program stored on the optical disc 4 or another storage medium is read into the main memory, and the CPU 10 causes execution of the display control program to be ready. The flowchart shown in FIG. 14 indicates the display control processing performed after completion of the above-described processing.

As shown in FIG. 14, the CPU 10 performs an initial setting (step 51) and proceeds to the subsequent step. For example, in the initial setting in step 51, various pieces of information described in the broadcast cell data Db2 is updated to the latest information as appropriate by using the electronic broadcast listing data obtained through communication with various servers connected to the network via the wireless communication module 18 and the antenna 22, the initial setting of the broadcast listing is performed. Also in the initial setting in step 51, respective parameters for displaying the broadcast listing are initialized. For example, the CPU 10 sets parameters indicated by respective pieces of data stored in the main memory to default values, respectively.

The CPU 10 performs display processing of the broadcast listing (step 52), and proceeds to the subsequent step. Specifically, the CPU 10 generates the broadcast listing in accordance with a state of the default setting set in step 51, and displays the generated broadcast listing on the monitor 2.

The CPU 10 obtains the operation information received from the controller 7 (step 53), and then proceeds to the subsequent step. The CPU 10 then updates the operation information Da by using the obtained latest operation information. The operation information obtained in step 53 includes key data indicative of how the operation section 72 of the controller 7 is operated, in addition to the process result data indicative of the positions of the markers 8L and 8R on the picked up image. The communication section 75 transmits the operation information to the game apparatus body 5 at a predetermined time interval (e.g., at an interval of 5 ms). The CPU 10 then uses the transmitted latest operation information on a frame-by-frame basis, and updates the first coordinate point data Da1, the second coordinate point data Da2, and the key data Da3.

The CPU 10 determines whether or not the user performs a scrolling operation of the broadcast listing (step 54), whether or not the user performs an operation to change the time axis of the broadcast listing (step 57), and whether or not the user performs an operation to change the character size of the broadcast listing (step 60). Specifically, the CPU 10 refers to the first coordinate point data Da1, the second coordinate point data Da2, and the key data Da3 included in the operation information Da, and determines a content of an operation performed by the user. The CPU 10 proceeds to subsequent step 55 when the user performs the scrolling operation of the broadcast listing (YES in step 54). Further, when the user performs the operation to change the time axis of the broadcast listing (YES in step 57), the CPU 10 proceeds to subsequent step 58. Still further, when the user performs the operation to change the character size of the broadcast listing (YES in step 60), the CPU 10 proceeds to subsequent step 61. On the other hand, when the user performs an operation which is different from the scrolling operation of the broadcast listing, the operation to change the time axis, and the operation to change the character size (NO in step 54, step 57 and step 60), then the CPU 10 proceeds to subsequent step 62.

In step 55, the CPU 10 updates the coordinate point of the display area in accordance with the scroll amount corresponding to the user's operation, and then proceeds to subsequent step 56. Specifically, the CPU 10 calculates the amount and the direction of scrolling the broadcast listing in accordance with a position pointed by the controller 7 and a pressing direction of the operation button 72a, and then updates the scroll amount data Db3. The CPU 10 calculates the coordinate points indicative of the left top corner and the right bottom corner of the display area, in accordance with the calculated amount and direction of scrolling, and updates the display area coordinate points data Db1. Hereinafter, an exemplary calculation of the position pointed by the controller 7 and an exemplary setting of the display area will be described.

For example, the CPU 10 calculates a direction from the position indicated by the first coordinate point data Da1 to the position indicated by the second coordinate point data Da2, and a middle point therebetween. In the case where there is only one image existing as the target image (the markers 8L and 8R) in the picked up image, the middle point represents said one image. In accordance with the difference between the middle point and a predetermined reference position, it is possible to calculate a change in the position of the image, the change being caused by the change in the position of the controller 7 with respect to the monitor 2.

Here, a positional relation among the markers 8L and 8R, the display screen of the monitor 2, and the controller 7 will be considered. For example, a case will be considered where two markers 8L and 8R are located on the top surface of the monitor 2 (see FIG. 1), and the user points the controller 7 to a central part of the display screen of the monitor 2 while orientating the top surface of the controller 7 upward (that is, in a state where the central part of the display screen is located at a central part of the image picked up by the imaging information calculation section 74). In this case, in the image picked up by the imaging information calculation section 74, the middle point of the target images (a middle point between the markers 8L and 8R) does not correspond to the central part of the picked up image. Specifically, the target images are located at positions above the central part of the picked image. A reference position is set such that the controller 7 points to the central part of the display screen when the target images are located at such positions. On the other hand, when the position pointed by the controller 7 is moved, the positions of the target images on the picked up image also moves (to a direction opposite to the moving direction of the controller 7). Therefore, processing is performed so as to move the pointed position on the display screen in accordance with the movement of the positions of the target images on the picked up image, whereby it is possible to calculate a position on the display screen pointed to by the controller 7.

In order to set the reference position, the user may previously points to a predetermined position on the display screen so as to correlate the positions of the target images at that time point with the predetermined position and to store the correlation. Alternatively, when the positional relation between the target images and the display screen is fixed, the reference position may be set previously. In this manner, the pointed position on the display screen is calculated based on linear transformation which uses a function for calculating, from the middle point, a coordinate point on the display screen of the monitor 2. The function converts a value of the coordinate point of the middle point calculated based on a picked up image into a position pointed to by the controller 7 on the display screen when the image is picked up by the controller 7. Based on the function, the pointed position on the display screen can be calculated based on the coordinate point of the middle point. When the user points the controller 7 to the display screen of the monitor 2 while orientating the top surface of the controller 7 toward a direction except for the upward direction (e.g., toward the right direction), the coordinate point of the middle point is corrected by using the direction stored in the direction data Db1, and the pointed position on the display screen is calculated by using the corrected middle point.

The CPU 10 further converts the calculated pointed to position on the display screen into a position on the broadcast listing corresponding thereto. For example, the position of the broadcast listing corresponding to the pointed position is perspectively projected to a position of the broadcast listing displayed on the display screen of the monitor 2.

As shown in FIG. 18, a position allocated based on the coordinate system fixed for the broadcast listing is set as a position of the display area. For example, the broadcast listing is set such that the vertical axis represents a broadcast station axis and the horizontal axis represents the time axis. A coordinate system (hereinafter referred to as a broadcast listing coordinate point), in which a position at the left top corner of the broadcast listing represents a coordinate point (x0, y0), and a position at the right bottom corner of the broadcast listing represents a coordinate point (xmax, ymax), is set for the broadcast listing. The display area is allocated at a portion in the broadcast listing. For example, a position at the left top corner (coordinate point (xa, ya)) and a position at the right bottom corner (coordinate point (xb, yb)) of the display area is set on the broadcast listing coordinate system, whereby a location and a size of the display area are determined. In above-described step 55, in accordance with the amount and the direction of scrolling set based on the user's operation, the position at the left top corner (coordinate point (xa, ya)) and the position at the right bottom corner (coordinate point (xb, yb)) of the display area are determined on the broadcast listing coordinate system, whereby the coordinate points of the display area is updated.

With reference back to FIG. 14, when the user performs an operation to change the time axis of the broadcast listing (Yes in step 57), the CPU 10 updates the drawing area width in accordance with the time axis changed in response to the user's operation (step 58). The CPU 10 then updates coordinate points of respective broadcast cells in accordance with the time axis changed in response to the user's operation (step 59), and proceeds to subsequent step 56. Specifically, the CPU 10 changes the drawing area width dw and a position (the left top corner coordinate point (xsa, ysa) and the right bottom corner coordinate point (xsb, ysb)) of each of the broadcast cells in accordance with the hourly time frames along the time axis having been changed by the user, thereby updating the drawing area width data Db2f and the broadcast cell coordinate point data Db2e.

For example, as shown in FIG. 19, a rectangular drawing area is set within the broadcast cell. A size of the drawing area is defined by the drawing area width dw and the drawing area size dh. As to the position of the broadcast cell, a position at the left top corner (coordinate point (xsa, ysa)) and a position at the right bottom corner (coordinate point (xsb, ysb)) of the drawing area is determined based on the broadcast listing coordinate system. In above-described step 58, the drawing area width dw of each of the broadcast cells is changed in accordance with the changed hourly time frames along the time axis, whereby the drawing area width data Db2f of each of the broadcast cells is updated. Further, in above-described step 59, the position of each of the broadcast cells (the left top corner coordinate point (xsa, ysa), the right bottom coordinate point (xsb, ysb)) is changed in accordance with the changed hourly time frames along the time axis, whereby the broadcast cell coordinate point data Db2e of each of the broadcasts cells is updated. The position of each of the broadcast cells may be changed by expanding or shortening each of the broadcast cells horizontally centering on a predetermined position (e.g., a central portion or a left edge) of the display area and by specifying the position of each of the broadcast cells in accordance with the broadcast listing coordinate system. Alternatively, each of the broadcast cells is expanded or shortened horizontally centering on a position pointed by the controller 7 on the broadcast listing, whereby the position of the position of each of the broadcast cells may be specified in accordance with the broadcast listing coordinate system.

With reference back to FIG. 14, when the user performs an operation to change the character size of the broadcast listing (Yes in step 60), the CPU 10 sets a user setting character size in accordance with the user's operation (step 61), and proceeds to subsequence step 63. Specifically, the CPU 10 updates the user setting character size data Db5 in accordance with the character size changed by the user. On the other hand, when the user performs an operation different from the operation to scroll the broadcast listing, the operation to change the time axis, and the operation to change the character size (No in step 54, step 57, and step 60), the CPU 10 performs another processing in accordance with the user's operation (step 62), and proceeds to subsequent step 64.

After processing in steps 55 and 59, the CPU 10 performs drawing area calculation processing (step 56), and proceeds to subsequent step 63. With reference to FIG. 15, the drawing area calculation processing will be described.

As shown in FIG. 15, the CPU 10 sets a variable N, which is indicative of a broadcast cell number to be processed, to 1 (step 81), and proceeds to the subsequent step.

The CPU 10 compares the coordinate points of the broadcast cell having the broadcast cell number N with the display area coordinate points (step 82), and determines whether or not the broadcast cell stays within the display area (step 83) and also determines whether or not any portion of the broadcast cell falls outside the display area (step 84). Specifically, the CPU 10 refers to the broadcast cell coordinate point data Db2e and the display area coordinate point data Db1 of the broadcast cell having the broadcast cell number N, and obtains the left top corner coordinate point (xsa, ysa) and the right bottom corner coordinate point (xsb, ysb) of the broadcast cell having the broadcast cell number N, and the left top corner coordinate point (xa, ya) and the right bottom corner coordinate point (xb, yb) of the display area. By using the coordinate points, a positional relation between the broadcast cell having the broadcast cell number N and the display area is analyzed. When a portion of the broadcast cell having the broadcast cell number N falls outside the display area (that is, a portion of the broadcast cell stays within the display area) (Yes in step 83, and Yes in step 84), the CPU 10 proceeds to subsequent step 85. When the whole portion of the broadcast cell having the broadcast cell number N stays within the display area (Yes in step 83, and No in step 84), the CPU 10 proceeds to subsequent step 86. When the whole portion of the broadcast cell having the broadcast cell number N falls outside the display area (No in step 83), the CPU 10 proceeds to subsequent step 88.

In step 85, the CPU 10 calculates the drawing area width dw of the broadcast cell having the broadcast cell number N, the drawing area width dw staying within the display area, and proceeds to subsequent step 87. For example, as shown in FIG. 20, when the left portion of the broadcast cell falls outside the display area, a width between a left edge of the display area and the right edge of the broadcast cell in the drawing area is calculated as the drawing area width dw.

In step 86, the CPU 10 sets the drawing area width dw of the broadcast cell having the broadcast cell number N by using the drawing area width dw corresponding to the currently set time axis, and then proceeds to subsequent step 87. In accordance with the currently set time axis, the CPU 10 sets the drawing area width dw of the broadcast cell having the broadcast cell number N by using a default value set in step 51, or by using a value set in step 58 after the change in the time axis. In step 86, when a situation where a portion of the drawing area in the broadcast cell having the broadcast cell number N is displayed outside the display area has been changed to a situation where the whole portion of the drawing area is located within the display area, the drawing area width dw needs to be changed. In other situations, the drawing area width dw is fixed. Under the situation where the drawing area width dw is fixed, the processing in step 86 may be omitted. In this case, the processing in step 86 is performed only when the situation where the portion of the drawing area in the broadcast cell having the broadcast cell number N is displayed outside the display area is changed to the situation where the whole of the drawing area is located within the display area.

In step 87, the CPU 10 updates the drawing area width data Db2f of the broadcast cell having the broadcast cell number N by using the drawing area width dw calculated in step 85, or by using the drawing area width dw set in step 86, and proceeds to subsequent step 88.

In step 88, the CPU 10 determines whether or not a current variable N represents the last number (Nmax) of the serial numbers which are described in the broadcast cell data Db2 and which are provided to the respective broadcast cells. In the case of N<Nmax, the CPU 10 adds 1 to the current variable N (step 89), and repeats the processing after returning back to step 82. On the other hand, in the case of N=Nmax, the CPU 10 terminates the processing in the sub-routine.

With reference back to FIG. 14, after processing in step 56 or step 61, the CPU 10 performs broadcast listing display updating processing (step 63), and proceeds to subsequent step 64. Hereinafter, with reference to FIG. 16, the broadcast listing display updating processing performed in step 63 will be described.

As shown in FIG. 16, the CPU 10 selects any one of television stations (see FIG. 18) displayed in a line respectively along the time axis of the broadcast listing (step 91). The CPU 10 determines whether or not a top edge of a display range of the selected television station is lower than the display area (step 92), and also determines whether or not a bottom edge of the display range of the selected television station is higher than the display area (step 93). When at least a portion of the display range of the selected television station stays within the display area (No in steps 92 and 93), the CPU 10 proceeds to subsequent step 94. On the other hand, when the whole of the display range of the selection television station falls outside the display area (Yes in step 92 or step 93), the CPU 10 proceeds to subsequent step 106. For example, with regard to television stations B, C, D, E and F shown in FIG. 18, at least a portion of the display range of each of the television stations stays within the display area. On the other hand, with regard to television stations A and G, the whole of the display range of each of the television stations falls outside the display area.

In step 94, the CPU 10 selects any one of the broadcast cells included in a television station currently selected. The CPU 10 determines whether or not a right edge of a drawing range of the selected broadcast cell is located to the left of the display area (step 95), and also determines whether or not a left edge of the drawing range of the selected broadcast cell is located to the right of the display area (step 96). When at least a portion of the drawing range of the selected broadcast cell stays within the display area (No in steps 95 and 96), the CPU 10 proceeds to subsequent step 97. On the other hand, the whole drawing range of the selected broadcast cell falls outside the display area (Yes in step 95 or 96), the CPU 10 proceeds to subsequent step 105. For example, when the television station C shown in FIG. 18 is selected, at least portions of broadcasts C1, C2, C3 and C4, respectively, stay within the display area. On the other hand, the whole drawing area of the broadcast cell of the broadcast C5 falls outside the display area.

In step 97, the CPU 10 changes the drawing character size of the broadcast cell currently selected by using the character size set by the user, and proceeds to the subsequent step. Specifically, the CPU 10 refers to the user setting character size data Db5 so as to obtain the user setting character size, and updates the drawing character size data Db2h of the broadcast cell currently selected by using the user setting character size.

The CPU 10 then performs the drawable-number-of-characters calculation processing (step 98), and proceeds to the subsequent step. Hereinafter, with reference to FIG. 17, an operation of the drawable-number-of-characters calculation processing will be described in detail.

As shown in FIG. 17, the CPU 10 sets the current number of characters to 0 (step 111), and also sets the drawable number of characters to 0 (step 112). The CPU 10 calculates the number of character lines drawable in the drawing area of the currently selected broadcast cell (step 113). The CPU 10 sets a current number of lines to 1 (step 114), and proceeds to the subsequent step. For example, in above-described step 113, the CPU 10 refers to the drawing area height data Db2g of the currently selected broadcast cell, and obtains the drawing area height dh. The CPU 10 refers to the drawing character size data Db2h of the currently selected broadcast cell, and obtains the drawing character size. The CPU 10 then calculates the drawable number of character lines by dividing the obtained drawing area height dh by a line-height previously set to the obtained drawing character size, thereby updating the drawable-number-of-lines data Db2i of the currently selected broadcast cell.

The CPU 10 determines whether or not the current number of lines exceeds the number of character lines drawable in the currently selected broadcast cell (step 115). For example, the CPU 10 refers to the drawable-number-of-lines data Db2i of the currently selected broadcast cell so as to obtain the drawable number of character lines, and determines whether or not the current number of lines exceeds the drawable number of character lines. When the current number of lines does not exceeds the number of character lines drawable in the currently selected broadcast cell, the CPU 10 proceeds to subsequent step 116. On the other hand, when the current number of lines exceeds the number of character lines drawable in the currently selected broadcast cell, the CPU 10 proceeds to subsequent step 122.

In step 116, the CPU 10 sets a current width to 0. The CPU 10 then determines whether or not the current number of characters reaches the number of characters of a broadcast title described in the currently selected broadcast cell (step 117). For example, the CPU 10 refers to the number-of-broadcast-title-characters data Db2c of the currently selected broadcast cell so as to obtain the number of characters of the broadcast title, and determines whether or not the current number of characters exceeds the number of characters of the broadcast title. When the current number of characters does not reach the number of characters of the broadcast title descried in the currently selected broadcast cell, the CPU 10 proceeds to subsequent step 118. On the other hand, when the current number of characters reaches the number of characters of the broadcast title described in the currently selected broadcast cell, the CPU 10 proceeds to subsequent step 122.

In step 118, the CPU 10 adds a width of a subsequent character to the current width. Then CPU 10 determines whether or not the current width has exceeded a width of the drawing area (step 119). For example, the CPU 10 refers to the drawing area width data Db2f of the currently selected broadcast cell, and obtains the drawing area width dw. The CPU 10 compares the obtained drawing area width dw with the current width, and determines whether or not the current width exceeds the width of the drawing area. When the current width does not exceed the width of the drawing area, the CPU 10 adds 1 to the current number of characters (step 120), and repeats the processing after returning back to step 117. On the other hand, when the current width exceeds the width of the drawing area, the CPU 10 adds 1 to the current number of lines (step 121), and repeats the processing after returning back to step 115.

Here, the width of the subsequent character described in step 118 represents a width of a character described subsequent to characters which are counted as the current number of characters described in the currently selected broadcast cell, and which constitute apart of the broadcast title characters. For example, when the current number of characters of exemplary broadcast cell data Db2 shown in FIG. 13 is "2", the character width of a character "C" described subsequently is regarded as the subsequent character width. Generally, in most cases, the character width varies even if the character size and a font style are constant. For example, in above-described step 118, font data previously set in the game apparatus body 5 is referred to, and then the character widths for respective character types are obtained.

When it is determined Yes in step 115, or when it is determined Yes in step 117, the CPU 10 sets the number of characters drawable in the currently selected broadcast cell by using the current number of characters (step 122), and terminates the processing in the sub-routine. For example, the CPU 10 updates the drawable-number-of-characters data Db2i of the currently selected broadcast cell by using the current number of characters. When it is determined Yes in step 115, the current number of lines exceeds the number of lines drawable in the currently selected broadcast cell. That is, the number of characters exceeding the current number of characters cannot be drawn in the drawing area of the currently selected broadcast cell. On the other hand, when it is determined Yes in step 117, the current number of characters reaches the number of characters of the broadcast title described in the currently selected broadcast cell. That is, there are no more characters than the current number of characters to be described in the drawing area of the currently selected broadcast cell. In this manner, in the drawable-number-of-characters calculation processing, drawing character size set to the broadcast cell is used as a reference, and when the number of characters described in the broadcast cell reaches a maximum number of characters drawable in the broadcast cell or reaches the number of the characters of the broadcast title to be described, the CPU 10 calculates and considers either of the numbers of characters as the drawable number of characters.

With reference back to FIG. 16, after the drawable-number-of-characters calculation processing in step 98, the CPU 10 determines whether or not the number of characters drawable in the currently selected broadcast cell is the same as the number of characters of the broadcast title (step 99). For example, the CPU 10 refers to the number-of-broadcast-title-characters data Db2c and drawable-number-of-characters data Db2j of the currently selected broadcast cell so as to obtain the number of characters of the broadcast title and the drawable number of characters, and determines whether or not the drawable number of characters and the number of characters of the broadcast title having been obtained are equal to each other. When the drawable number of characters is different from the number of characters of the broadcast title, the CPU 10 proceeds to subsequent step 100. On the other hand, when the drawable number of characters is equal to the number of characters of the broadcast title, the CPU 10 proceeds to subsequent step 103.

In step 100, the CPU 10 determines whether or not the number of characters drawable in the currently selected broadcast cell is three or more. For example, the CPU 10 refers to the drawable-number-of-characters data Db2j of the currently selected broadcast cell so as to obtain the drawable number of characters, and determines whether or not the obtained drawable number of characters is three or more. When the drawable number of characters is two or lower, the CPU 10 proceeds to subsequent step 101. On the other hand, when the drawable number of characters is three or more, the CPU 10 proceeds to subsequent step 103.

In step 101, the CPU 10 determines whether or not the drawing character size of the currently selected broadcast cell is a minimum size. For example, the CPU 10 refers to the drawing character size data Db2h of the currently selected broadcast cell so as to obtain the drawing character size, and determines whether or not the obtained drawing character size is the minimum character size (e.g., the "extra small" character size). When the drawing character size is not the minimum character size, the CPU 10 sets the drawing character size smaller by one level and updates the drawing character size data Db2h of the currently selected broadcast cell (step 102). The CPU 10 then returns back to step 98 and repeats the processing. On the other hand, when the drawing is the minimum size, the CPU 10 proceeds to subsequent step 104.

In step 103, the CPU 10 draws the drawable number of characters in the drawing area of the selected broadcast cell by using the set drawing character size, and then proceeds to subsequent step 105. For example, the CPU 10 refers to the broadcast cell data Db2 of the selected broadcast cell, and arranges and draws the drawable number of characters of a character string of a broadcast title horizontally from a left edge of the drawing area of the broadcast cell in the display area by using the set drawing character size. When a portion of the drawing area falls outside the display area, the character string of the broadcast title is arranged and drawn in a limited portion of the drawing area, the limited portion staying within the display area. When the drawable number of characters is set with respect to a plurality of lines in the drawing area of the broadcast cell, the character string of the broadcast title is arranged and drawn by using the plurality of lines in the drawing area (see FIGS. 9 to 11).

In step 104, the CPU 10 does not draw a character in the drawing area of the selected broadcast cell (i.e. leaves the drawing area blank), and proceeds to subsequent step 105. That is, when three or more characters cannot be described in the drawing area of a broadcast cell even if the drawing character size is the minimum, the broadcast cell is left blank (see broadcast cell C3 and the like shown in FIGS. 9 to 11).

In step 105, the CPU 10 determines whether or not there is any broadcast cell which is yet to be processed in the television station currently selected. When there is a broadcast cell which is yet to be processed in the television station currently selected, the CPU 10 returns to step 94 and repeats the processing. On the other hand, when there is no broadcast cell which is yet to be processed in the television station currently selected, the CPU 10 proceeds to subsequent step 106.

In step 106, the CPU 10 determines whether or not there is any television station which is yet to be processed in the broadcast listing. When there is a television station yet to be processed in the broadcast listing, the CPU 10 returns to step 91 and repeats the processing. On the other hand, when all the television stations in the broadcast listing have been processed, the CPU 10 terminates the processing in the subroutine.

With reference back to FIG. 14, after processing in step 63 or step 62, the CPU 10 determines whether or not a display of the broadcast listing is terminated (step 64). As a condition for terminating the display, for example, when the condition for terminating the display of the broadcast listing is satisfied, or when the user performs an operation for terminating the display of the broadcast, the display is terminated. When the display is not terminated, the CPU 10 returns to step 53 and repeats the processing. When the display is terminated, the CPU 10 terminates the processing in the flowchart.

In this manner, the game apparatus body 5 executing the display control program according to the present embodiment is capable of improving viewability of display information in accordance with the user's character size setting, and enhancing operability to improve the viewability of the display information. For example, in accordance with a size of the drawing area of each broadcast cell and a specified character size, the number of characters drawable in the drawing area is calculated, and the character size to be drawn in each drawing area is determined in accordance with the drawable number of characters. Accordingly, the viewability of the broadcast listing can be improved. Further, in response to the user's operation, whether or not the character size is to be changed is determined and then processed with respect to each of the drawing areas, and thus operability to improve the viewability is enhanced.

The above description is exemplified by an example where the character size for describing the broadcast title has four levels ("large", "medium", "small" and "extra small"). However, the character size is not necessarily set to have the four levels. For example, the broadcast title may be described by using the character size having two or three levels, or the broadcast title may be described by using the character size having five or more levels.

In the above description, a rule is set such that at least three characters of the broadcast title is to be described in each of the broadcast cells. However, another type of rule may be applicable. For example, the minimum number of characters to be described in the broadcast cell may be determined by the user.

Further, in accordance with the number of characters drawable in the drawing area of the broadcast cell, the character size drawn in the drawing area may be changed. For example, suppose that the drawable number of characters in the case of the "small" character size is calculated. When the number of characters drawable in a drawing area is three or more and less than five, the characters are drawn in the "small" character size in the drawing area. When the number of characters drawable in the drawing area is five or more and less than seven, the drawable number of characters in the case of the "medium" character size is calculated, and then the characters are drawn in the "medium" character size in the drawing area. When the number of characters drawable in the drawing area is seven or more, the drawable number of characters in the case of the "large" character size is calculated, and then the characters are drawn in the "large" character size in the drawing area. As another example, suppose that the user sets the character size is set to the "medium" size. When the number of characters drawable in a drawing area is less than three, the characters are drawn in the "small" character size, which is smaller than the set character size. When the number of characters drawable in the drawing area is three or more and less than five, characters are drawn in the set "medium" character size. When the number of characters drawable in the drawing area is five or more, the drawable number of characters in the case of the "large" character size, which is larger than the set character size, is calculated, and then characters are drawn in the "large" character size if adaptable. As another example, a broadcast title of each of the broadcast cells is drawn in a larger character size as long as the drawable number of character is more than a predetermined number of characters (e.g., three characters). Accordingly, in accordance with the number of characters drawable in the drawing area, the characters can be enlarged to a larger character size than the set character size, to the extent that an appropriate number of characters can be drawn in the drawing range, whereby the viewability of the display information can be further improved.

Further, a priority order is set to each of the characters of the character string which is indicated by the broadcast title character string data Db2b and is described in the broadcast cell, and the characters may be displayed in order of the priority when all the characters of the broadcast title cannot be described. Accordingly, characters which are likely to be redundant with those of another broadcast title are assigned relatively low priority, whereby it is possible to distinguish the broadcast title with another broadcast title even though only a few characters of the broadcast title is displayed.

In the drawing area width calculation processing in above-described step 56, when a portion of the drawing area falls outside the display area, the drawing area width dw is reset with respect to a width direction of the drawing area. In the processing, when a portion of the drawing area goes off the right of the display area (see FIG. 20), and when the portion of the drawing area goes off the right of the display area, the drawing area width dw may be reset. In this case, in step 103, when the portion of the drawing area falls outside the display area, the broadcast title is drawn in a limited drawing area which stays within the display area. Alternatively, in the drawing area width calculation processing, only when the portion of the drawing area goes off the left of the display area, the drawing area width dw may be reset. In this case, when a left side portion of the drawing area falls outside the display area in above-described step 103, the broadcast title is drawn in the limited drawing area which stays within the display area. When a right side portion of the drawing area falls outside the display area, the broadcast title is drawn in the drawing area including the portion which falls outside the display area (i.e. there is no limitation in the drawing area).

In the drawing area width calculation processing in step 56, when the portion of the drawing area falls outside the display area, the drawing area height dh may be reset with respect to a height direction of the drawing area. In this case, when the portion of the drawing area goes off the top of the display area, and when the portion of the drawing area goes off the bottom of the display area, the drawing area height dh is reset. Further, in step 103, when the portion of the drawing area falls outside the display area, the broadcast title is drawn in the limited drawing area which stays within the display area.

In the above description, the broadcast listing in the matrix form is applied, in which the horizontal axis represents the time axis, and the vertical axis represents the broadcast station axis. However, a broadcast listing in another form may be applied. For example, a broadcast listing in the matrix from, in which the horizontal axis represents the broadcast station axis and the vertical axis represents the time axis, may be applied to the present invention. In this case, whether or not a portion of the drawing area of the broadcast cell falls outside the display area is determined with reference to a vertical direction (height) of the drawing area, whereby a similar display control processing can be realized.

The above description is exemplified by a two-dimensional broadcast listing which is arranged in a two-dimensional virtual world. However, it is obvious that a display control of a broadcast listing arranged in a three-dimensional virtual world is also feasible.

The above description is exemplified by the display control of the character string described in each of the broadcast cells in the broadcast listing in the matrix form, in which the horizontal axis represents the broadcast station axis and the vertical axis represents the time axis. However, it is possible to perform the display control of a character string described in a mode different from that used for the broadcast listing. For example, it may be possible to perform the display control of character strings described in respective cells of a game schedule in the matrix form, in which one axis represents a type of a game and the other axis represents the time axis. Further, it may be possible to perform the display control of character strings described in respective cells of a schedule in a matrix form, in which any two of the time axis, a date axis, a day-of-the-week axis, a user axis and the like are used as axes thereof. Further, it may be possible to perform the display control of character strings described in respective cells of a chart in a matrix form having a plurality of rows and columns. In this manner, the present invention is applicable to any character string described in respective cells in a chart form as well as the broadcast listing, and obviously, in this case as well, an effect similar to that exerted in the case of the broadcast listing can be obtained.

A mode has been described in which the image data picked up by the image pickup element 743 is analyzed so as to obtain a position coordinate points of the infrared radiations from the markers 8L and 8R and barycentric coordinate points thereof, and the processing result data thereof is generated within the controller 7 and transmitted to the game apparatus body 5. However, another processing stage data may be transmitted from the controller 7 to the game apparatus body 5. For example, the image data picked up by the image pickup element 743 is transmitted from the controller 7 to the game apparatus body 5, and the CPU 10 performs the above-described analysis processing so as to obtain the processing result data. In this case, the image processing circuit 744 provided to the controller 7 is not required. Further, partially analyzed image data may be transmitted from the controller 7 to the game apparatus body 5. For example, data indicative of brightness, a position, an area and the like, which are obtained from the image data, is transmitted from the controller 7 to the game apparatus body 5, and the CPU 10 performs remaining analysis processing so as to obtain the processing result data.

In the above description, the infrared radiations from the markers 8L and 8R are used as the imaging targets of the imaging information calculation section 74 of the controller 7. However, another material may be used as the imaging target. For example, one marker or three or more markers are placed in the vicinity of the monitor 2, and the infrared radiations from the markers may be used as the imaging targets of the imaging information calculation section 74. Further, the display screen of the monitor 2 and another luminous element (such as interior light) may be used as the imaging target of the imaging information calculation section 74. As long as a position on the display screen pointed by the controller 7 is calculated based on the positional relation between the imaging target and the display screen of the monitor 2, any luminous element can be used as the imaging target of the imaging information calculation section 74.

The above description is exemplified by a mode in which the controller 7 and the game apparatus body 5 are connected to each other via the wireless communication. However, the controller 7 and the game apparatus body 5 may be electrically connected to each other via a cable. In this case, the cable connected to the controller 7 is connected to a connection terminal of the game apparatus body 5.

Further, it is obvious that the above-described shape of the controller, the shapes, the number, the positions and the like of the operation sections 72 provided thereto, respective equations, constants, processing orders and the like which are used in the display control processing are merely examples. Any other shapes, numbers, equations, constants, and processing orders may be used to realize the present invention. A position of the imaging information calculation section 74 (a light entrance of the imaging information calculation section 74) in the controller 7 is not necessarily located at the front surface of the housing 71, and may be located at any other surface as long as light can be obtained from an outside of the housing 71.

The above description is exemplified by a case where the present invention is applied to the stationary game apparatus body 5 which performs processing in accordance with an operation performed with the controller 7. However, the present invention may be applicable to a hand-held game apparatus. For example, the above-described display control processing is executed in accordance with an operation performed by using operation buttons provided on the hand-held game apparatus body. In this manner, the present invention is applied to the hand-held game apparatus and the like, whereby the display control processing of the present invention can be realized by using the hand-held game apparatus.

The above description is exemplified by a case where the present invention is applied to the stationary and hand-held game apparatuses. However, the present invention may be applicable to an information processing apparatus such as a general personal computer and a portable information processing apparatus which are each operated by an input device. As the portable information processing apparatus, devices such as a general personal computer, a mobile phone, and a PDA (Personal Digital Assistant) are adaptable.

Further, the display control program of the present invention is not only previously stored in the involatile storage apparatus in the game apparatus body 5, but may be provided to the game apparatus body 5 via an external storage medium such as the optical disc 4. As the information storage medium storing the display control program, involatile semiconductor memory may be applicable in addition to a CD-ROM, a DVD and any other optical disc storage media. Alternatively, the display control program may be provided to the game apparatus body 5 via a wired or wireless communication line.

The storage medium having stored thereon the display control program according to the present invention, and the display control apparatus are capable of improving the viewability of display information and enhancing the operability to improve the viewability of the display information, and accordingly, are useful as a program and an apparatus for displaying predetermined characters in a plurality of drawing areas.

While the invention has been described in detail, the foregoing description is in all aspects illustrative and not restrictive. It is understood that numerous other modifications and variations can be devised without departing from the scope of the invention.

What is claimed is:

1. A non-transitory computer readable storage medium having stored thereon a display control program executed by a computer system, having one or more processors, of an apparatus for arranging and displaying predetermined character strings in a plurality of drawing areas, the computer being caused to function as:
    a character size acquisition unit for acquiring a character size to be displayed;
    a number-of-characters calculation unit for calculating the number of characters arrangeable in each of the drawing areas, in accordance with a size of each of the drawing areas and the character size acquired by the character size acquisition unit;
    a character string arranging unit for selecting, in accordance with the number of characters calculated by the number-of-characters calculation unit, whether to arrange each of the character strings in each of the drawing areas by using the character size obtained by the character size acquisition unit, or to arrange each of the character strings in each of the drawing areas by using a character size different from the obtained character size, and for arranging each of the character strings in each of the drawing areas by using the selected character size;
    a number-of-characters determination unit for determining whether or not the number of characters calculated by the number-of-characters calculation unit is equal to or more than a predetermined number; and
    a display control unit for displaying the character strings arranged by the character string arranging unit on a display apparatus,
    wherein the character string arranging unit arranges, when the number-of-characters determination unit determines that the number of characters in a drawing area, among the plurality of drawing areas, is equal to or more than the predetermined number, a character string in the drawing area by using the character size acquired by the character size acquisition unit, and also arranges, when the number-of-characters determination unit determines that the number of characters in a drawing area, among the plurality of drawing areas, is less than the predetermined number, a character string in the drawing area by using the character size relatively smaller than the character size acquired by the character size acquisition unit.

2. The non-transitory computer readable storage medium having stored thereon the display control program according to claim 1, the computer system being further caused to function as:
    an operation data acquisition unit for acquiring operation data of a user,
    wherein the character size acquisition unit acquires the character size to be displayed in accordance with operation details indicated by the operation data.

3. The non-transitory computer readable storage medium having stored thereon the display control program according to claim 2, wherein
    when the character size acquired by the character size acquisition unit is changed, the number-of-characters calculation unit recalculates a changed number of characters arrangeable in each of the drawing areas, in accordance with the size of each of the drawing areas and the changed character size which is acquired by the character size acquisition unit,
    the number-of-characters determination unit determines whether or not the changed number of characters, which is recalculated by the number-of-characters calculation unit in accordance with the changed character size which is acquired by the character size acquisition unit is equal to or more than the predetermined number, and
    the character string arranging unit changes the character size of the character string to be drawn only in a drawing area, among the plurality of drawing areas, with respect to which the number-of-characters determination unit determines that the changed number of characters is equal to or more than the predetermined number.

4. The non-transitory computer readable storage medium having stored thereon the display control program according to claim 3, wherein
    the computer system is further caused to function as a character size reducing unit for reducing, when the number-of-characters determination unit determines that the number of characters in a drawing area, among the plurality of drawing areas, is less than the predetermined number, the character size of a character string arranged in the drawing area,
    when the character size reducing unit reduces the character size, the number-of-characters calculation unit recalculates the number of characters arrangeable in the drawing area in accordance with the reduced character size and a size of the drawing area of the character string in the reduced character size, and
    the number-of-characters determination unit determines whether or not the number of characters, which is recalculated by the number-of-character calculation unit in accordance with the reduced character size which is reduced by the character size reducing unit, is equal to or more than the predetermined number.

5. The non-transitory computer readable storage medium having stored thereon the display control program according to claim 4, wherein when the number-of-characters determination unit determines that the number of characters arrangeable in the drawing area is less than the predetermined number under a circumstance where the character size reducing unit has reduced and minimized the character size, the character string arranging unit leaves the drawing area blank.

6. The non-transitory computer readable storage medium having stored thereon the display control program according to claim 2, wherein,
    the number-of-characters calculation unit includes:
    a number-of-lines calculation unit for calculating the number of character lines arrangeable in a drawing area, among the drawing areas, in accordance with a length of one side of the drawing area and a length of a character in the one side direction, the character having the character size obtained by the character size acquisition unit; and a number-of-characters-per-line calculation unit for calculating the number of characters per line, which is arrangeable in one line in the drawing area, in accordance with a length of the other side of the drawing area and a length of the character in the other side direction, the character having the character size obtained by the character size acquisition unit, the number-of-characters calculation unit calculates the number of characters arrangeable in the drawing area in accordance with the number of the character lines and the number of the characters per line.

7. The non-transitory computer readable storage medium having stored thereon the display control program according to claim 2, wherein the computer system is further caused to function as:

a drawing area size changing unit for changing the size of each of the drawing areas in accordance with the operation details indicated by the operation data; and a drawing area size calculation unit for calculating, when the size of each of the drawing areas is changed by the drawing area size changing unit, the changed size of each of the drawing areas, the number-of-characters calculation unit calculates a changed number of characters arrangeable in each of the drawing areas in accordance with the changed size of each of the drawing areas and the character size obtained by the character size acquisition unit.

8. The non-transitory computer readable storage medium having stored thereon the display control program according to claim 7, wherein the plurality of drawing areas is arranged and displayed in a matrix form, and the drawing area size changing unit changes a scale of the matrix in one side direction in accordance with the operation details indicated by the operation data, and changes a length in the one side direction of each of the arranged drawing areas.

9. The non-transitory computer readable storage medium having stored thereon the display control program according to claim 7, wherein the plurality of drawing areas are arranged and displayed in a matrix form, and when a display area to be displayed on the display apparatus is moved in accordance with the operation details indicated by the operation data and when a portion of a drawing area, among the plurality of drawing areas, falls outside the display area, the drawing area size changing unit changes the size of the drawing area so as to limit the drawing area to a portion thereof which stays within the display area.

10. The non-transitory computer readable storage medium having stored thereon the display control program according to claim 2, wherein the plurality of drawing areas is arranged in a matrix form and displayed as a broadcast listing in which one axis represents a time axis and the other axis represents a broadcast station axis, and the character string arranging unit at least arranges, in the drawing areas, the character strings indicative of titles of broadcasts corresponding to respective broadcast stations and broadcasting times thereof.

11. A display control apparatus for arranging and displaying predetermined character strings in a plurality of drawing areas, comprising:

a character size acquisition unit for acquiring a character size to be displayed;

a number-of-characters calculation unit for calculating the number of characters arrangeable in each of the drawing areas, in accordance with a size of each of the drawing areas and the character size acquired by the character size acquisition unit;

a character string arranging unit for selecting, in accordance with the number of characters calculated by the number-of-characters calculation unit, whether to arrange each of the character strings in each of the drawing areas by using the character size obtained by the character size acquisition unit or to arrange each of the character strings in each of the drawing areas by using a character size different from the obtained character size, and for arranging each of the character strings in each of the drawing areas by using the selected character size;

a display control unit for displaying the character strings arranged by the character string arranging unit on a display apparatus; and a number-of-characters determination unit for determining whether or not the number of characters calculated by the number-of-characters calculation unit is equal to or more than a predetermined number, wherein the character string arranging unit arranges, when the number-of-characters determination unit determines that the number of characters in a drawing area, among the plurality of drawing areas, is equal to or more than the predetermined number, a character string in the drawing area by using the character size acquired by the character size acquisition unit, and also arranges, when the number-of-characters determination unit determines that the number of characters in a drawing area, among the plurality of drawing areas, is less than the predetermined number, a character string in the drawing area by using the character size relatively smaller than the character size acquired by the character size acquisition unit.

12. The display control apparatus according to claim 11, further comprising:

an operation data acquisition unit for acquiring operation data of a user, wherein the character size acquisition unit acquires the character size to be displayed in accordance with operation details indicated by the operation data.

13. The display control apparatus according to claim 12, wherein when the character size acquired by the character size acquisition unit is changed, the number-of-characters calculation unit recalculates a changed number of characters arrangeable in each of the drawing areas, in accordance with the size of each of the drawing areas and the changed character size which is acquired by the character size acquisition unit, the number-of-characters determination unit determines whether or not the changed number of characters, which is recalculated by the number-of-characters calculation unit in accordance with the changed character size which is acquired by the character size acquisition unit is equal to or more than the predetermined number, and the character string arranging unit changes the character size of the character string to be drawn only in a drawing area, among the plurality of drawing areas, with respect to which the number-of-characters determination unit determines that the changed number of characters is equal to or more than the predetermined number.

14. A method implemented using at least one processor for arranging and displaying predetermined character strings in a plurality of drawing areas, the method comprising:

acquiring a character size to be displayed;

calculating, via the at least one processor, the number of characters arrangeable in each of the drawing areas, in accordance with a size of each of the drawing areas and the acquired character size;

selecting, in accordance with the calculated number of characters, whether to arrange each of the character strings in each of the drawing areas by using the acquired character size, or to arrange each of the character strings in each of the drawing areas by using a character size different from the acquired character size;

arranging each of the character strings in each of the drawing areas by using the selected character size;

determining whether or not the calculated number of characters is equal to or more than a predetermined number; and displaying the arranged character strings on a display apparatus, wherein a character string in the drawing area is arranged by using the acquired character size when it is determined that the number of characters in a drawing area, among the plurality of drawing areas, is equal to or more than the predetermined number, and wherein a character string in the drawing area is arranged by using the character size relatively smaller than the acquired character size when it is determined that the number of characters in a drawing area, among the plurality of drawing areas, is less than the predetermined number.

15. A display control system, comprising:

a display apparatus; and a computer system, having one or more processors, the computer system configured for arranging and displaying predetermined character strings in a plurality of drawing areas and configured to:

acquire a character size to be displayed, calculate the number of characters arrangeable in each of the drawing areas, in accordance with a size of each of the drawing areas and the acquired character size, select, in accordance with the calculated number of characters, whether to arrange each of the character strings in each of the drawing areas by using the acquired character size, or to arrange each of the character strings in each of the drawing areas by using a character size different from the acquired character size, and arrange each of the character strings in each of the drawing areas by using the selected character size, determine whether or not the calculated number of characters is equal to or more than a predetermined number, and display the arranged character strings on the display apparatus, wherein a character string in the drawing area is arranged by using the acquired character size when it is determined that the number of characters in a drawing area, among the plurality of drawing areas, is equal to or more than the predetermined number, and wherein a character string in the drawing area is arranged by using the character size relatively smaller than the acquired character size when it is determined that the number of characters in a drawing area, among the plurality of drawing areas, is less than the predetermined number.

* * * * *